(12) United States Patent
Mohamed et al.

(10) Patent No.: US 11,821,357 B2
(45) Date of Patent: Nov. 21, 2023

(54) TURBOCHARGER TURBINE ASSEMBLY

(71) Applicant: Garrett Transportation I Inc., Torrance, CA (US)

(72) Inventors: Ashraf Mohamed, Torrance, CA (US); Denis Tisserant, Thaon-les-Vosges (FR); Stephane Pees, Thaon-les-Vosges (FR); Frederic Nicolle, Thaon-les-Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/564,713

(22) Filed: Dec. 29, 2021

(65) Prior Publication Data
US 2023/0203983 A1    Jun. 29, 2023

(51) Int. Cl.
| F02B 37/24 | (2006.01) |
| F01D 17/16 | (2006.01) |
| F02B 37/22 | (2006.01) |

(52) U.S. Cl.
CPC ............ *F02B 37/24* (2013.01); *F01D 17/165* (2013.01); *F02B 37/225* (2013.01); *F05D 2220/40* (2013.01); *F05D 2240/55* (2013.01)

(58) Field of Classification Search
CPC ...... F02B 37/24; F02B 37/225; F01D 17/165; F05D 2220/40; F05D 2240/55
See application file for complete search history.

(56) References Cited

U.S. PATENT DOCUMENTS

| 2005/0260067 A1* | 11/2005 | Parker | ................ | F01D 17/165 |
| | | | | 415/160 |
| 2006/0042247 A1* | 3/2006 | Haugen | .................. | F02C 3/13 |
| | | | | 60/600 |
| 2014/0133970 A1* | 5/2014 | Groves | .................... | F02C 6/12 |
| | | | | 415/159 |

FOREIGN PATENT DOCUMENTS

| EP | 0 248 624 A2 | 12/1987 |
| EP | 1 584 796 A2 | 10/2005 |
| EP | 2 557 275 A2 | 2/2013 |
| EP | 2 940 253 A1 | 11/2015 |
| EP | 3 628 827 A1 | 4/2020 |

OTHER PUBLICATIONS

EP Extended European Search Report, EP Application No. 22 18 1605, dated Jan. 9, 2023 (6 pages).

* cited by examiner

*Primary Examiner* — Loren C Edwards
(74) *Attorney, Agent, or Firm* — Brian J. Pangrle

(57) ABSTRACT

A turbine housing assembly can include a turbine housing that defines a rotational axis for a turbine wheel; and a cartridge receivable by the turbine housing, where the cartridge includes a nozzle wall component with an upper nozzle surface and a plate component with a lower nozzle surface, where the upper nozzle surface and the lower nozzle surface define a nozzle space, and vanes positioned in the nozzle space, where the vanes are pivotable between a closed vanes position of 0 percent open and a fully open vanes position of 100 percent open, and where, for a vanes position of at least 50 percent open and less than 75 percent open, an axial dimension of the nozzle space increases with respect to decreasing radius as measured from the rotational axis.

16 Claims, 16 Drawing Sheets

US 11,821,357 B2

TURBOCHARGER TURBINE ASSEMBLY

TECHNICAL FIELD

Subject matter disclosed herein relates generally to turbochargers for internal combustion engines.

BACKGROUND

Exhaust driven turbochargers include a rotating group that includes a turbine wheel and a compressor wheel that are connected to one another by a shaft. The shaft is typically rotatably supported within a center housing by one or more bearings. During operation, exhaust from an internal combustion engine drives a turbochargers turbine wheel, which, in turn, drives the compressor wheel to boost charge air to the internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
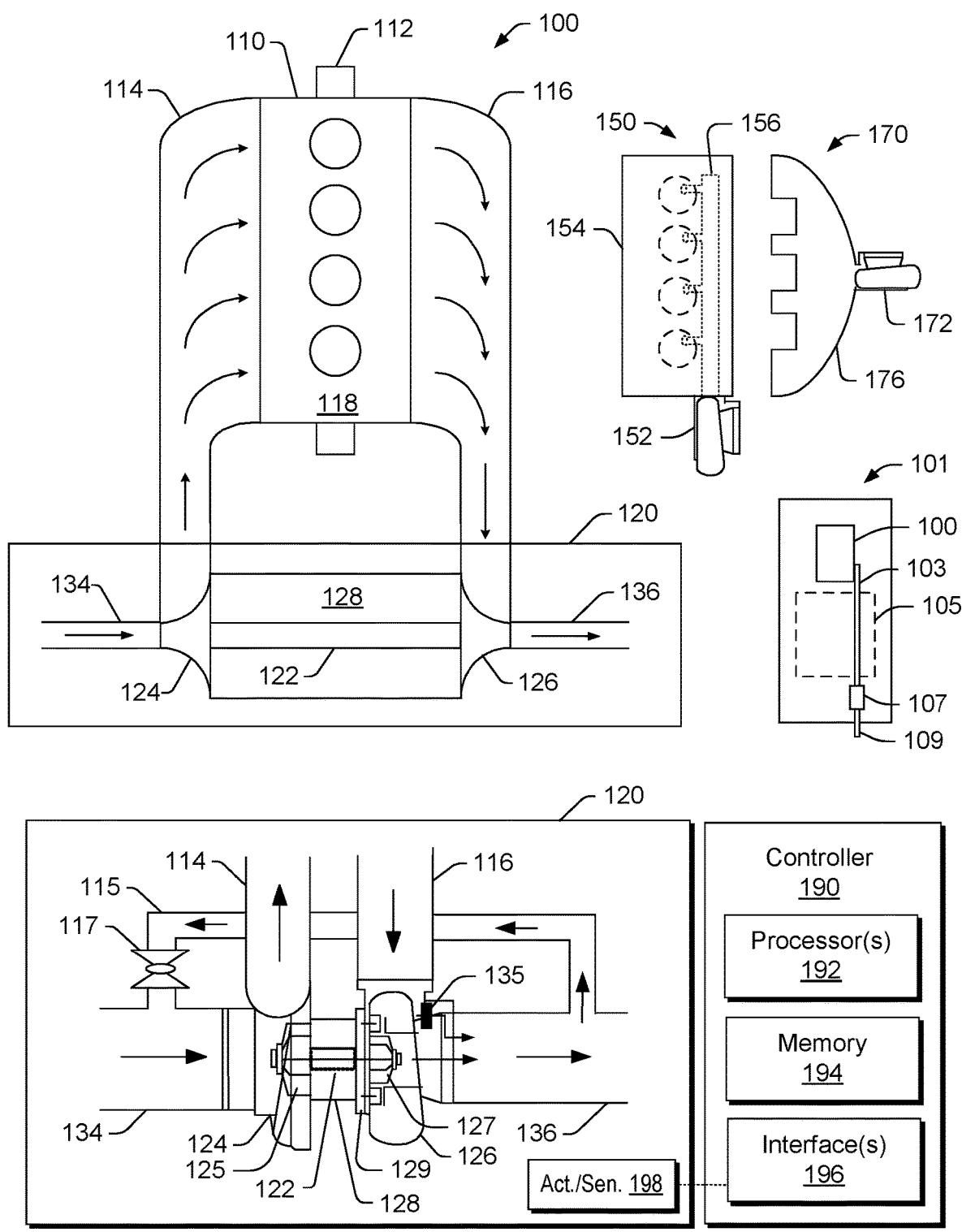
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 fora turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
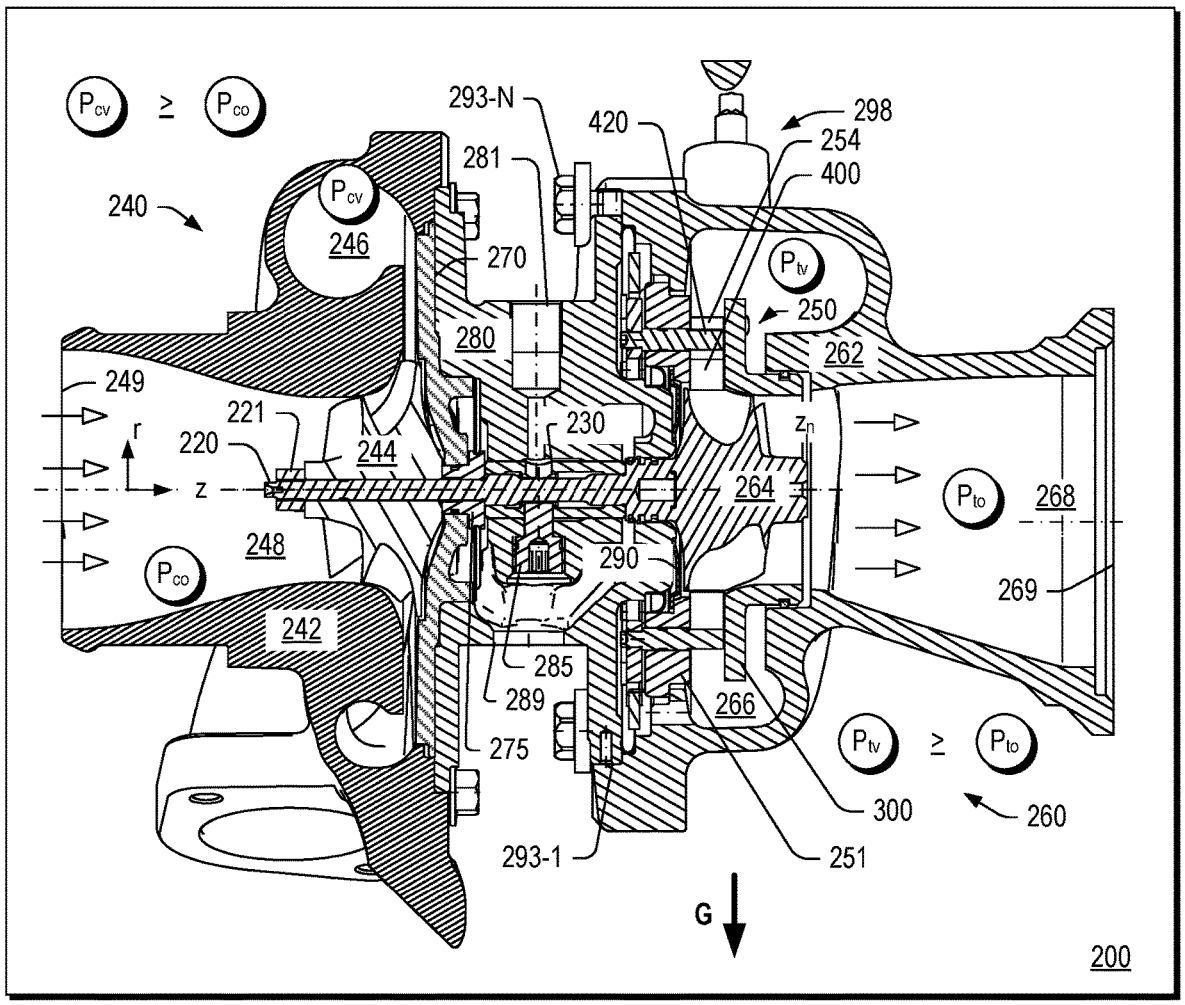
FIG. 2 is a cutaway view of an example of a turbocharger.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 that defines a compressor side (left) and a turbine assembly 260 that defines a turbine side (right). The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

As an example, a wheel, whether a turbine wheel or a compressor wheel, can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge). A wheel may be defined in part by a trim value that characterizes a relationship between inducer and exducer portions.

For a compressor wheel, the inducer portion can be characterized by a "minor" diameter; whereas, for a turbine wheel, the inducer portion can be characterized by a "major" diameter. During operation, inlet flow to a compressor wheel or a turbine wheel occurs with respect to its inducer portion and outlet flow from a compressor wheel or a turbine wheel occurs with respect to its exducer portion.

As to air flow, during operation of the turbocharger 200, air can be directed from the compressor wheel 244 to the volute 246 via a diffuser section defined in part by the compressor housing 242 and a compressor side plate 270 as the compressor wheel 244 rotates, drawing air into a passage 248 via an inlet 249, both of which may be defined by the compressor housing 242. As indicated in FIG. 2, during operation of the turbocharger 200, the compressor wheel 244 acts to boost air pressure such that air pressure in the volute 246 ($P_{cv}$) is greater than air pressure in the passage 248 ($P_{co}$). Rotation of the compressor wheel 244 can generate a negative pressure that acts to "suck" air into the compressor assembly 240 and to direct such air to the volute 246 via the diffuser section. As an example, where exhaust gas recirculation (EGR) is implemented, environmental air may be mixed with exhaust (e.g., upstream and/or downstream of the compressor wheel 244).

In the example of FIG. 2, an axial locating pin 285 is received in an opening of the bearing 230, which may be a cross-bore of the bearing 230. As an example, one or more other types of axial locating mechanisms may be included in a turbocharger that act to limit axial movement of a bearing (e.g., and/or movement in one or more other directions). As an example, a locating pin may allow for radial movement of a bearing, which may allow for effective operation of one or more lubricant films disposed about a surface of the bearing.

In the example of FIG. 2, the shaft 220 includes a step (e.g., a shoulder) that forms an axial annular face. In the example of FIG. 2, a thrust collar 275 (e.g., a type of collar) includes a surface that is seated against the axial annular face of the shaft 220. In such an example, a lock nut 221 can include threads that match threads of an end portion of the shaft 220 such that tightening of the lock nut 221 with respect to the shaft 220 loads the compressor wheel 244 and the thrust collar 275 against the axial annular face of the shaft 220, which can place the shaft 220 (e.g., from the step to its end portion) in tension. In such an example, the shaft 220, the compressor wheel 244 and the lock nut 221 can rotate as a unit (e.g., responsive to exhaust driving the turbine wheel 264). As shown in the example of FIG. 2, the compressor side plate 270 can include a bore (e.g., an opening) in which at least a portion of the thrust collar 275 is positioned where the thrust collar 275 (and/or the compressor side plate 270) can include a groove or grooves that may seat a seal element or seal elements (e.g., O-rings, piston rings, etc.).

In the example of FIG. 2, the turbine assembly 260 includes a variable geometry assembly 250, which may be referred to as a "cartridge" (e.g., the cartridge 250), that may be positioned using an plate component 251, which may be referred to as a flange (e.g., optionally shaped as a stepped annular disc or annular plate), of the cartridge 250 that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280 and may be resilient in that it can apply a biasing force. As shown in the example of FIG. 2, the cartridge 250 includes a nozzle wall component 300 and the plate component 251. As an example, one or more mounts or spacers 254 may be disposed between the nozzle wall component 300 and the plate component 251 (e.g., or annular plate component), for example, to axially space the nozzle wall component 300 and the plate component 251 (e.g., forming a nozzle space).

As an example, vanes 400 may be positioned between the nozzle wall component 300 and the plate component 251, for example, where a control mechanism may cause pivoting of the vanes 400. As an example, the vane 400 may include a vane post 420 that extends axially to operatively couple to a control mechanism, for example, for pivoting of the vane 400 about a pivot axis defined by the vane post 420.

As to exhaust flow, during operation of the turbocharger 200, higher pressure exhaust in the volute 266 passes through passages (e.g., a nozzle or nozzles, a throat or throats, etc.) of the cartridge 250 to reach the turbine wheel 264 as disposed in a turbine wheel space defined at least in part by the cartridge 250 and at least in part by the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_{tv}$) is greater than exhaust pressure in the passage 268 ($P_{to}$).

As an example, exhaust pressure in the turbine assembly 260 can depend on position or positioning of the vanes 400. For example, closing and/or opening of the vanes 400 (e.g., narrowing or widening throats) can effect exhaust gas pressure at one or more locations.

While FIG. 2 shows a general direction of gravity (G, Earth's gravity), the orientation of the turbocharger 200 may be in an orientation in an engine compartment that is suitable for operation given particulars of lubricant feed, flow and drainage.

As an example, a turbine assembly of an exhaust gas turbocharger can include vanes as part of a variable geometry turbine (VGT) or variable nozzle turbine (VNT). Vanes may be disposed at least in part in a cartridge where the cartridge is disposed between a turbine housing and a center housing of a turbocharger.

As an example, a cartridge may include a nozzle wall component and a plate component spaced axially by mounts (e.g., spacers) where vanes are accommodated to control exhaust flow from a volute to a turbine wheel space. As an example, a vane may include a trailing edge and a leading edge with a pressure side airfoil and a suction side airfoil that meet at the trailing edge and the leading edge. Such a vane may have a planar upper surface and a planar lower surface where a clearance exists between the planar upper surface and the nozzle wall component (e.g., between a lower planar surface of an annular portion of the nozzle wall component) and/or where a clearance exists between the planar lower surface and the plate component (e.g., between an upper planar surface of an annular portion of the plate component).

As an example, each vane may include an axis about which the vane may pivot (e.g., a pivot axis). As an example, each vane may include a post (e.g., or axle) that defines a pivot axis. As an example, a post may be integral with a vane (e.g., cast as a single piece of metal, alloy, etc.) or a post may be a separate component that can be operatively coupled to a vane.

As an example, movement of a vane (e.g., arcwise) may be less closer to the pivot axis and greater further away from the pivot axis. For example, a trailing edge or a leading edge may be disposed a distance from the pivot axis such that upon pivoting of a vane, the leading edge and/or the trailing edge sweeps a maximum arc of the vane for a desired amount of pivoting. If clearance between an upper surface of a vane and a lower surface of a nozzle wall component is diminished, the vane may bind (e.g., stick), where the risk may increase depending on arc length as interaction area can increase with respect to arc length. In such an example, deformation to a nozzle wall component may cause a vane or vanes to bind upon pivoting or even in a static position. Binding (e.g., sticking) can result in loss of control, stress to a control mechanism, wear, etc.

As an example, forces acting on a vane and/or a post of a vane may cause a vane or vanes to bind upon pivoting or even in a static position. Binding can result in loss of control, stress to a control mechanism, wear, etc.

As to pressure differentials and temperatures in a variable geometry turbine assembly, as an example, exhaust in a volute may have pressure in a range of approximately 120 kPa to approximately 400 kPa and possible peak pressure of up to approximately 650 kPa (absolute) and, for example, temperature in a range of approximately 150 degrees C. to approximately 980 degrees C.; whereas, at a location axially downstream of a turbine wheel, exhaust may have pressure in a lower range and temperature in a lower range. Exhaust gas temperatures in a gasoline fuel internal combustion engine may exceed those of a diesel fuel internal combustion engine. Where a variable geometry turbine assembly is utilized with a gasoline fuel internal combustion engine, the environment may be harsher in terms of temperature when compared to a diesel fuel internal combustion engine.

As an example, one or more components of a variable geometry turbine assembly (e.g., VGT assembly or variable nozzle turbine (VNT) assembly) can include at least a portion made of a material that can withstand pressures and temperatures in the aforementioned ranges. For example, a material can be the INCONEL 718 alloy (Specialty Materials Corporation, New Hartford, NY). Some other examples of materials include INCONEL 625, C263 (aluminum-titanium age hardening nickel), René 41 (nickel-based alloy), WASPALOY alloy (age hardened austenitic nickel-based alloy, United Technologies Corporation, Hartford, CT), etc.

As an example, a cartridge can include vanes that are disposed at least in part between two components. As an example, at least a portion of a vane may be made of a material such as HK30, which is a chromium-nickel-iron stainless steel alloy including approximately 30% chromium and 20% nickel, with the balance being predominantly iron (percentages by mass). As an example, at least a portion of a vane may be made of a HK series stainless steel alloy that includes about 18-22% nickel by mass. Such an alloy can be fully austenitic. As an example, one or more components of a cartridge may be made of a material such as, for example, PL23 alloy or 310 SS alloy.

As an example, an exhaust gas variable geometry turbine assembly can include a number of pivotable vanes that define, at least in part, throats within an exhaust gas nozzle where each of the pivotable vanes includes a corresponding post.

Figure 3A:
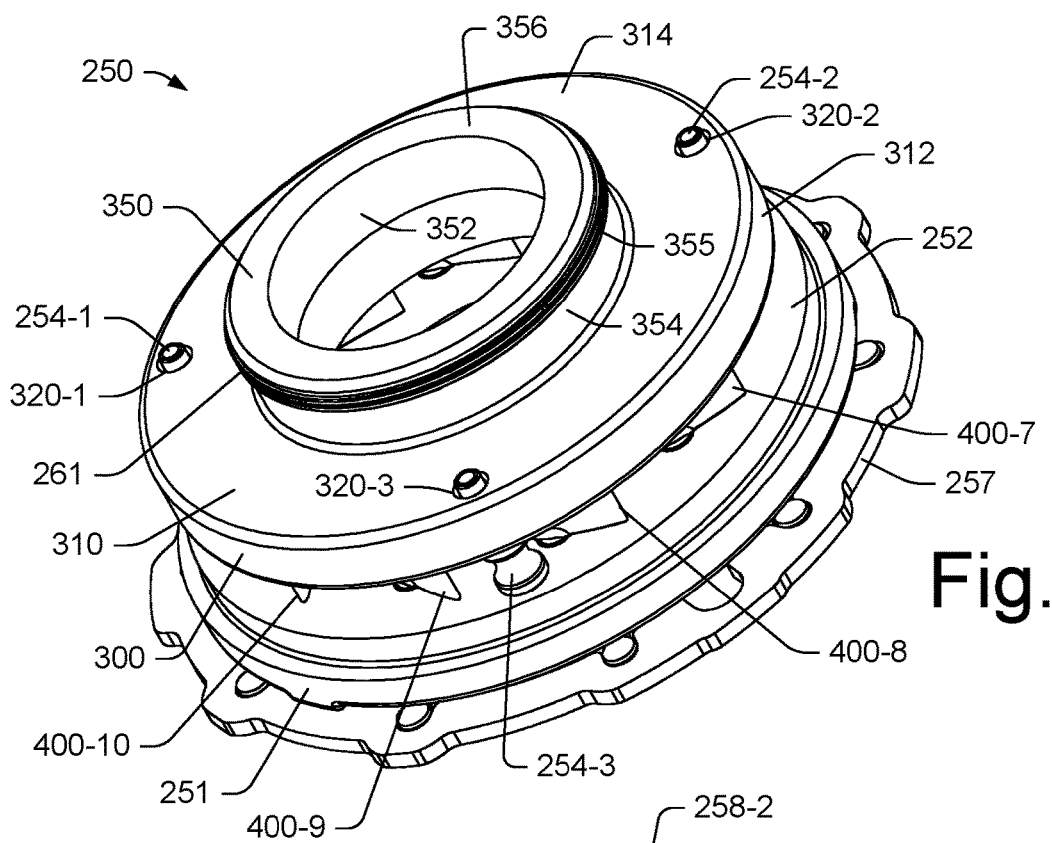
FIGS. 3A and 3B are perspective views of an example of a cartridge of a turbocharger.
Figure 3B:
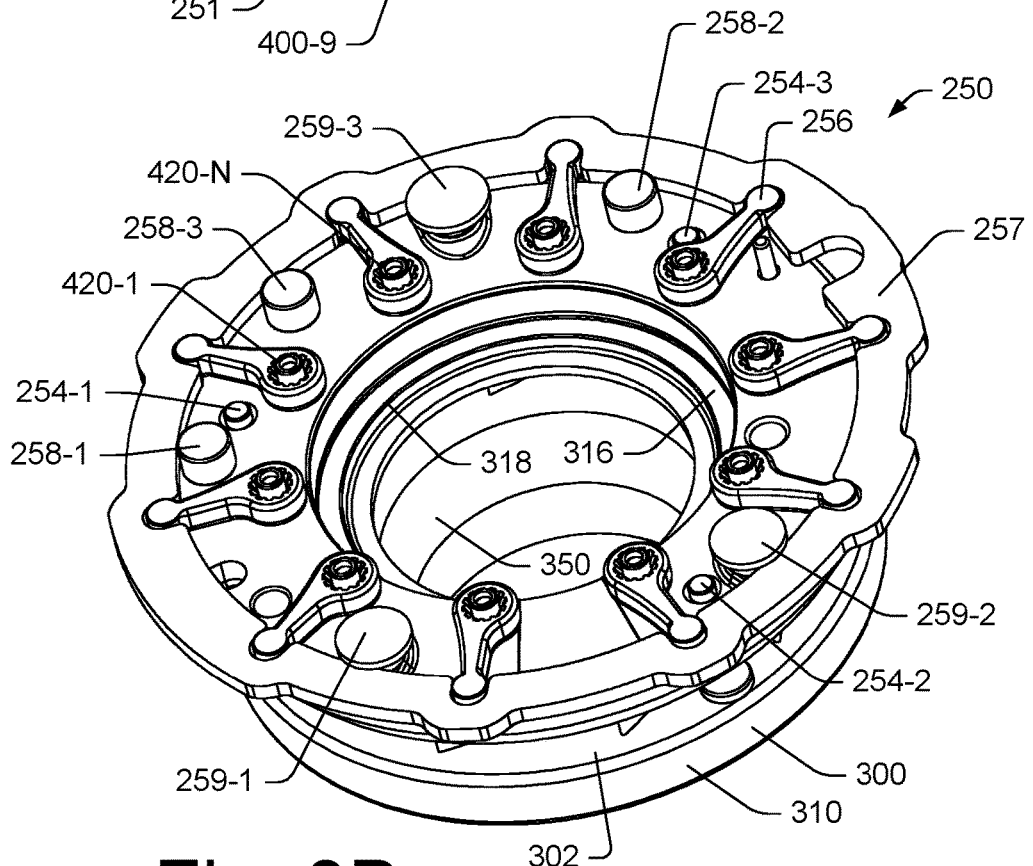

FIGS. 3A and 3B show perspective views of the example cartridge 250 of FIG. 2. In FIGS. 3A and 3B, the nozzle wall component 300 includes a lower surface that can be a nozzle upper surface 302 of an annular plate portion 310. As an example, the nozzle wall component 300 can include a cylindrical pipe portion 350. Where the nozzle wall component 300 includes the cylindrical pipe portion 350, the overall shape of the nozzle wall component 300 can be referred to as a hat shape. As shown, the annular plate portion 310 includes an outer perimeter defined by an outer surface 312. The outer surface 312 meets opposing annular surfaces 314 and 316 where the annular surface 316 includes a shroud portion 318 as a shroud of a turbine wheel space for a turbine wheel where a clearance exists between the shroud portion 318 and a suitable turbine wheel disposed in the turbine wheel space.

As shown, the nozzle wall component 300 includes a plurality of bores 320-1, 320-2 and 320-3 (e.g., spacer bores), which receive a plurality of spacers 254-1, 254-2 and 254-3, which space the nozzle wall component 300 axially with respect to the plate component 251. As shown, the plate component 251 includes an upper surface that can be a nozzle lower surface 252 where a nozzle is defined by the nozzle upper surface 302 and the nozzle lower surface 252. The bores 320-1, 320-2 and 320-3 are shown as being cylindrical and extending between the opposing surfaces 314 and 316 of the nozzle wall component 300 where the bores 320-1, 320-2 and 320-3 each has a diameter and an axial length along a bore axis where the bore axes are at a radius of an axis defined by the turbine wheel space, for example, as defined by the shroud portion 318, which may be referred to as a rotational axis (e.g., an intended rotational axis of a turbine wheel disposed in the turbine wheel space). In the example of FIGS. 3A and 3B, the cartridge 250 can be installed in a turbocharger, which may then be installed in an engine compartment of an internal combustion engine. The nozzle wall component 300 can be subjected to various conditions (e.g., forces, temperatures, pressures, etc.), which can impact the nozzle wall component 300 (e.g., as to integrity, shape, etc.).

As to the cylindrical pipe portion 350, it includes an inner surface 352 and an outer surface 354, as well as an end surface 356. The cylindrical pipe portion 350 can be defined at least in part by an inner diameter, an outer diameter and an axial length, for example, as measured along the rotational axis. In the example shown, the outer surface 354 includes one or more grooves 355 that can receive one or more seal elements (e.g., seal components such as or akin to piston rings). In the example shown, the surface 314 and the surface 354 meet and form a shoulder that has an angle of approximately 90 degrees. As to the surface 316 and the surface 352, they meet at respective ends of the shroud portion 318. For example, the surface 316 can be substantially flat, meet the shroud portion 318, which is contoured, which then meets the surface 352, which extend axially to the end surface 356. As shown, the end surface 356 is an annular surface the meets the inner surface 352 and the outer surface 354.

The perspective views show one or more seal rings 261 seated in the one or more grooves 355 of the nozzle wall component 300, the plurality of spacers 254-1, 254-2 and 254-3, a plurality of vanes 400 (e.g., 400-1 to 400-N) and corresponding vane posts 420-1 to 420-N, a plurality of vane control arms 256, a unison ring 257, a plurality of pins 258-1, 258-2 and 258-3, and a plurality of guides 259-1, 259-2 and 259-3.

In the example of FIGS. 3A and 3B, the unison ring 257 may be rotated about a central axis (e.g., substantially aligned with the axis of rotation of a turbine wheel) to cause the plurality of vane control arms 256 to rotate about respective post axes of individual vane posts 420 of the plurality of vanes 400. The plurality of pins 258-1, 258-2 and 258-3 and the plurality of guides 259-1, 259-2 and 259-3 may help to align the unison ring 257 with respect to other components of the cartridge 250.

In the example of FIGS. 3A and 3B, one or more ends of the spacers 254-1, 254-2 and 254-3 may be fixed (e.g., riveted, capped, etc.). For example, an end of a spacer may be flattened to a radius that is greater than an opening of a bore through which the spacer extends such that the spacer cannot be moved axially into the bore. As shown, each of the spacers 254-1, 254-2 and 254-3 includes a nozzle portion with a radius and/or a diameter that is greater than a corresponding end portion of opposing end portions that are received by respective spacer bores of the nozzle wall component 300 and the plate component 251. For example, a spacer can be defined by one or more radii and/or one or more diameters as well as one or more axial dimensions such as an axial dimension of a nozzle portion.

The nozzle portion of each of the spacers 254-1, 254-2 and 254-3 can include opposing shoulders where one shoulder abuts the nozzle wall component 300 and the other shoulder abuts the plate component 251 to define a nozzle axial dimension, which can be slightly larger than a vane axial dimension to allow vanes to pivot in the nozzle where a clearance may be defined based at least in part on one or more thermal considerations (e.g., thermal expansion, contraction, etc.).

In the example of FIGS. 3A and 3B, the cartridge 250 may be secured as a cartridge unit via riveting ends of the spacers 254-1, 254-2 and 254-3, which fixes an axial distance between the nozzle wall component 300 and the plate component 251 at a given temperature (e.g., an ambient temperature during assembly). Such a riveting process may introduce some amount of stress at the passages (e.g., bores) of the nozzle wall component 300 and/or the plate component 251 through which the spacers 254-1, 254-2 and 254-3 pass.

Figure 4:
FIG. 4 is a cutaway plan view of the cartridge of FIGS. 3A and 3B.

FIG. 4 shows a plan view of a portion of a cartridge 250 that includes a plurality of vanes 400. The vanes 400 are represented in FIG. 4 via solid lines and dashed lines where the solid lines indicate an open position of the vanes 400 and where the dashed lines indicate a closed position of the vanes 400. Open headed arrows are shown to approximately illustrate the direction of exhaust flow between adjacent pairs of the vanes 400 when in the open position. In the closed position, the vanes 400 act as obstacles to exhaust flow such that pressure can be higher in a region radially outward from the vanes 400 in comparison to a region radially inwardly from the vanes 400. In such an example, clearances between the vanes 400 and the upper and lower nozzle surfaces 302 and 252 are minimal such that bypass of exhaust in such clearances is minimized. Exhaust flow that does occur may be referred to as exhaust leakage. As explained, however, the clearances are to be sufficient to reduce risk of binding where vane binding against the nozzle surfaces 302 and 252 can confound controllability. Where risk of binding exists, an actuator may demand more power, which may mean larger size, more cost, more energy consumption, etc. Hence, design of the cartridge 250 generally involves balancing risk of binding (e.g., sticking) and exhaust leakage in the closed position.

In the example of FIG. 4, in the open position, the trailing edges of the vanes 400 can define a circle as indicated by a thick dashed line and, in the closed position, the trailing edges of the vanes 400 can define another circle, which may be approximately the same as a circle that circumscribes the pivot axis (e.g., vanes posts 420) of the vanes 400. Hence, as the vanes 400 move from a closed position to an open position, a circle of decreasing radius (e.g., diameter) can be defined by the trailing edges of the vanes 400. Further, as shown, the leading edges of the vanes 400 may define a circle of increasing radius (e.g., diameter).

As an example, a range of angles for a set of vanes can be defined using a closed position and a fully open position. In such an example, the closed position may be defined where pivoting is limited for one or more reasons. For example, one reason for limitation of pivoting is vane contact where neighboring vanes contact each other (e.g., vane-to-vane contact). Another reason may be due to one or more stops that are built into an actuator or other control linkage. As to a fully open position, it can be defined utilizing one or more references. For example, an outer radius of a turbine wheel can be utilized where, in a fully open position, trailing edges of a set of vanes are within a range of approximately 3 percent to approximately 10 percent of the outer radius of the turbine wheel. In such a range, the trailing edges can be spaced a distance sufficiently away from blades of a turbine wheel such that leading edges of the blades do not contact trailing edges of the vanes when the set of vanes is in the fully open position. Such a distance can be tailored to be not too large for purposes of appropriate performance and not too small for purposes of avoiding turbine wheel-to-vane contact (e.g., given vibration, thrust forces on a turbine wheel, thermal effects, etc.). A range of angles can have a minimum angle and a maximum angle where an intermediate angle can be defined as being a 50 percent open angle. As explained, one or more features of a set of vanes (e.g., leading edges and/or trailing edges) may be utilized to define one or more radii (e.g., one or more diameters) that can be utilized to define one or more features of an assembly.

Figure 5:
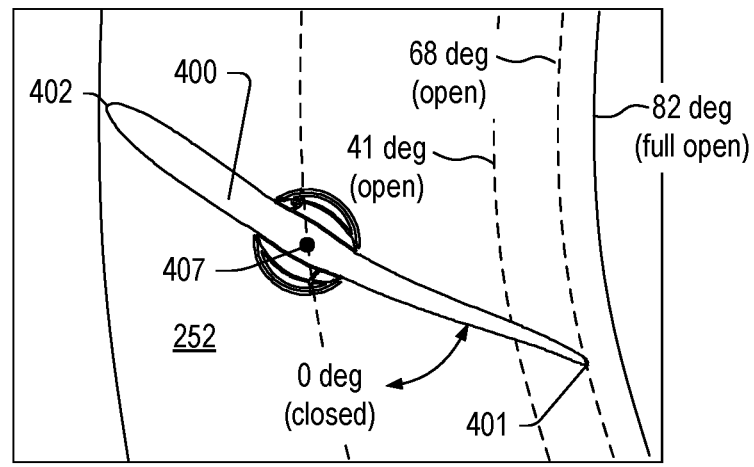
FIG. 5 is series of views of a portion of the cartridge of FIGS. 3A and 3B.
Figure 5:
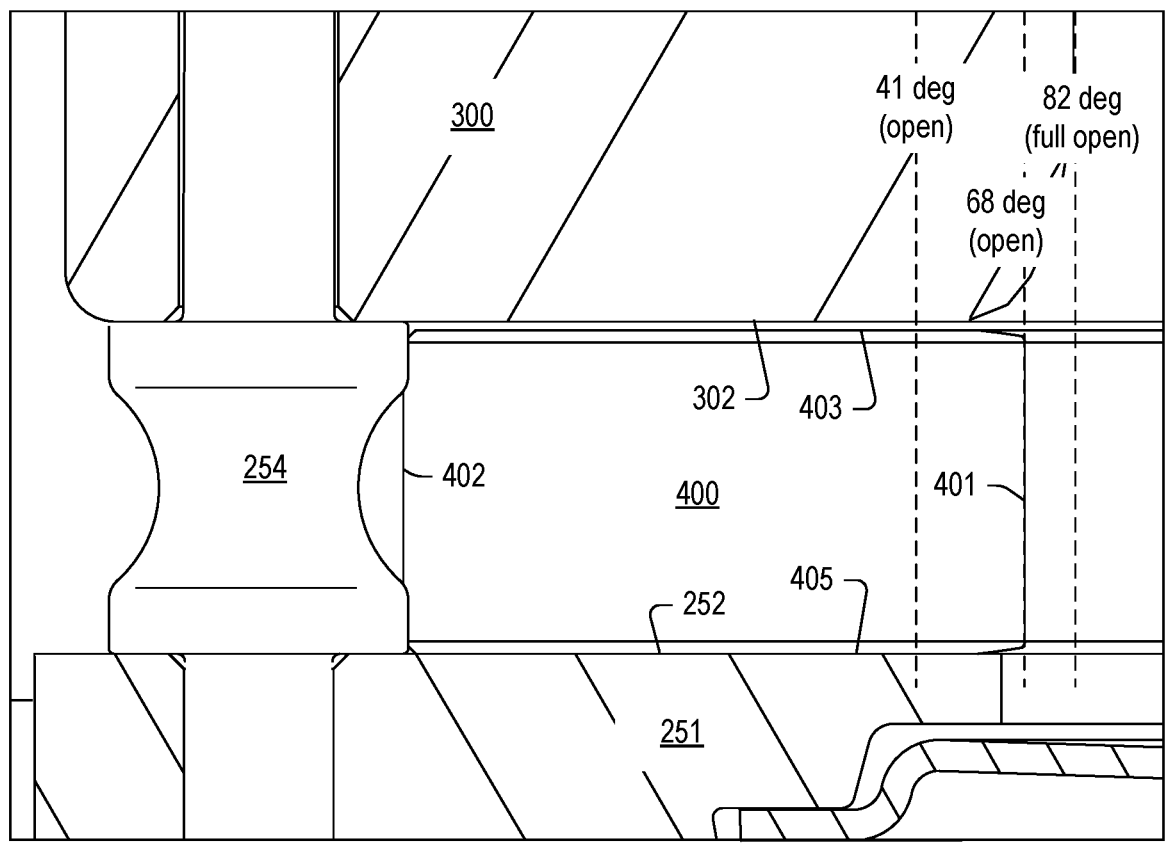

FIG. 5 shows a plan view and a cut-away view of a portion of the cartridge 250 where various angles are indicated, including a 0 degree closed angle with a corresponding circle, a 41 degree open angle with a corresponding circle, a 68 degree angle with a corresponding circle and a 82 degree full open angle with a corresponding circle.

As shown in the example of FIG. 5, the vane 400 includes a trailing edge 401 and a leading edge 402 with a pressure side airfoil and a suction side airfoil that meet at the trailing edge 401 and the leading edge 402. As shown, the vane 400 can have a planar upper surface 403 and a planar lower surface 405 where a clearance exists between the planar upper surface 403 and the upper nozzle surface 302 of the wall component 300 and/or where a clearance exists between the planar lower surface 405 and lower nozzle surface 252 of the plate component 251.

In the example of FIG. 5, the trailing edge 401 or the leading edge 402 may be disposed a distance from a pivot axis 407 of the vane 400 such that upon pivoting of the vane 400, the leading edge 402 and/or the trailing edge 401 sweeps a maximum arc of the vane 400 for a desired amount of pivoting. As explained, if clearance between the upper surface 403 of the vane 400 and the upper nozzle surface 302 is diminished, the vane 400 may bind (e.g., stick), where the risk may increase depending on arc length as interaction area can increase with respect to arc length. In such an example, deformation to the nozzle wall component 300 may cause the vane 400 to bind upon pivoting or even in a static position. Binding (e.g., sticking) can result in loss of control, stress to a control mechanism, wear, etc.

As an example, a turbine assembly can include a non-uniform or variable clearance between an upper surface of a vane and an upper nozzle surface. For example, the clearance can increase with respect to decreasing radius of the upper nozzle surface. In such an example, the clearance may be sufficiently small in a closed position of vanes for purposes of reduced exhaust leakage and be larger in an open position of the vanes for purposes of reduced binding and/or decreased resistance to exhaust flow. For example, a clearance may increase for vane open positions that are greater than or equal to 50 percent of a fully open position. In such an example, the vane open position where clearance increases may be defined using an angle, a diameter, etc., for example, as explained with respect to the example of FIG. 4.

Figure 6:
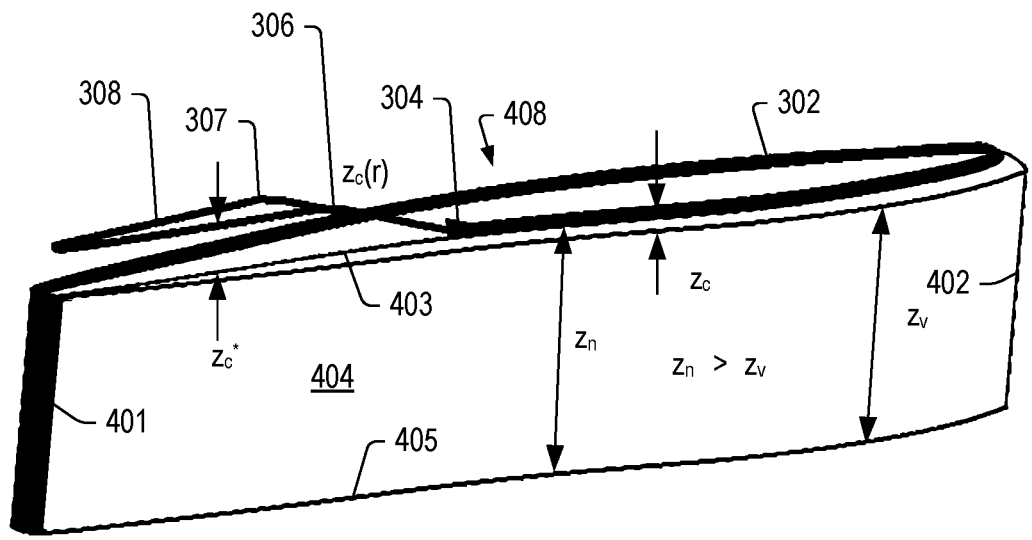
FIG. 6 is a perspective view of an example of a vane and an example of a nozzle surface.

FIG. 6 shows a perspective view of the vane 400 where a pressure side airflow surface 404 and a suction side airflow surface 408 are indicated with respective labels. Further, an outline of the upper nozzle surface 302 is shown as existing above the vane 400 as would be present in an assembled turbine assembly where the nozzle surface 302 can be a relatively constant region that meets a first transition point 304 that meets a variable region 306 that meets a second transition point 307 that meets an elevated region 308.

In the example of FIG. 6, various dimensions are illustrated, including a vane height $z_v$, a nozzle height $z_n$ (e.g., between nozzle surfaces 302 and 252), a clearance $z_c$ (e.g., between surfaces 403 and 302), a variable clearance $z_c(r)$ and an enlarged clearance $z_c^*$. In such an example, the first transition point 304 can correspond to a 50 percent open position of the trailing edge 401 of the vane 400.

As an example, a vane may be defined in part via one or more airfoil terms (e.g., dimensions, etc.). For example, the vane 400 can be defined in part by one or more of a camber line that can be a surface mid-way between the surfaces 404 and 408, a chord length, a thickness, an upper camber, a lower camber, a pivot axis, etc. In the example of FIG. 6, the vane 400 is shown as being relatively slender with a thickness that is less than the chord length. As shown in FIG. 5, the vane 400 can have its pivot axis 407 located approximately mid-way between the leading and trailing edges 402 and 401; noting that the vane 400 has a length from the pivot axis 407 to the trailing edge 401 that is greater than a length from the pivot axis 407 to the leading edge 402 such that, if the vane 400 was spun 360 degrees about its pivot axis 407 (e.g., as a single vane without interference from other vanes), the leading edge 402 would form a circle centered on the pivot axis 407 with a smaller radius than a circle centered on the pivot axis 407 for the trailing edge 401.

Figure 7:
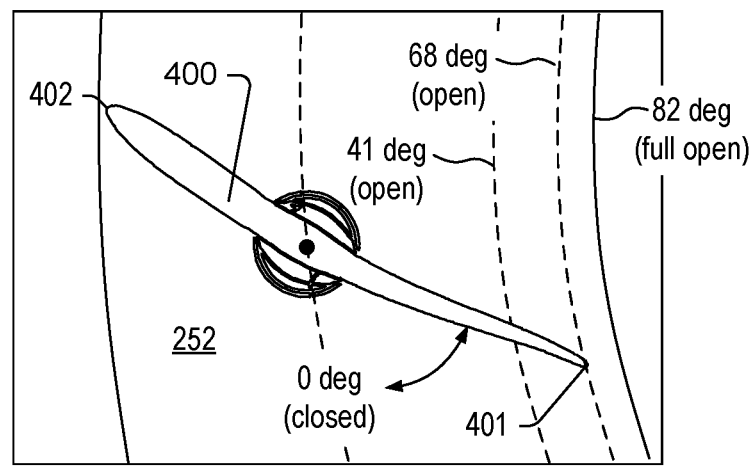
FIG. 7 is a series of views of a portion of the cartridge of FIGS. 3A and 3B where an increased clearance exists between a vane and a nozzle surface.
Figure 7:
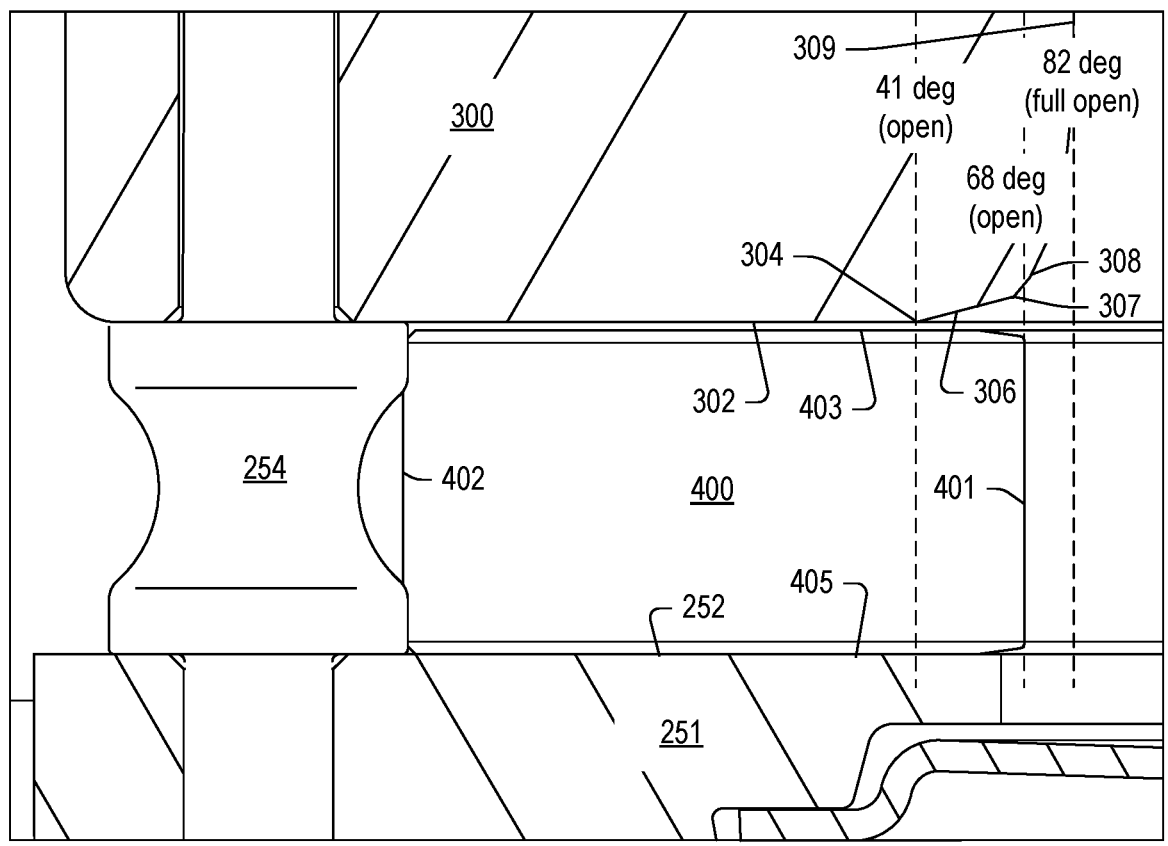

FIG. 7 shows a plan view and a cut-away view of the example of FIG. 5, however, with a different clearance profile between the vane 400 and the upper nozzle surface 302, as represented by at least the first transition point 304, the variable surface region 306 and the second transition point 307, which may transition to a shroud profile 308 that may transition to a relatively vertical surface 309. In comparison to the example of FIG. 5, due to the increased clearance region, the vane 400 can have reduced risk of binding at open angles greater than approximately 41 degrees, which may be a half-open angle, compared to the 82 degree full open angle (e.g., fully open).

Figure 8:
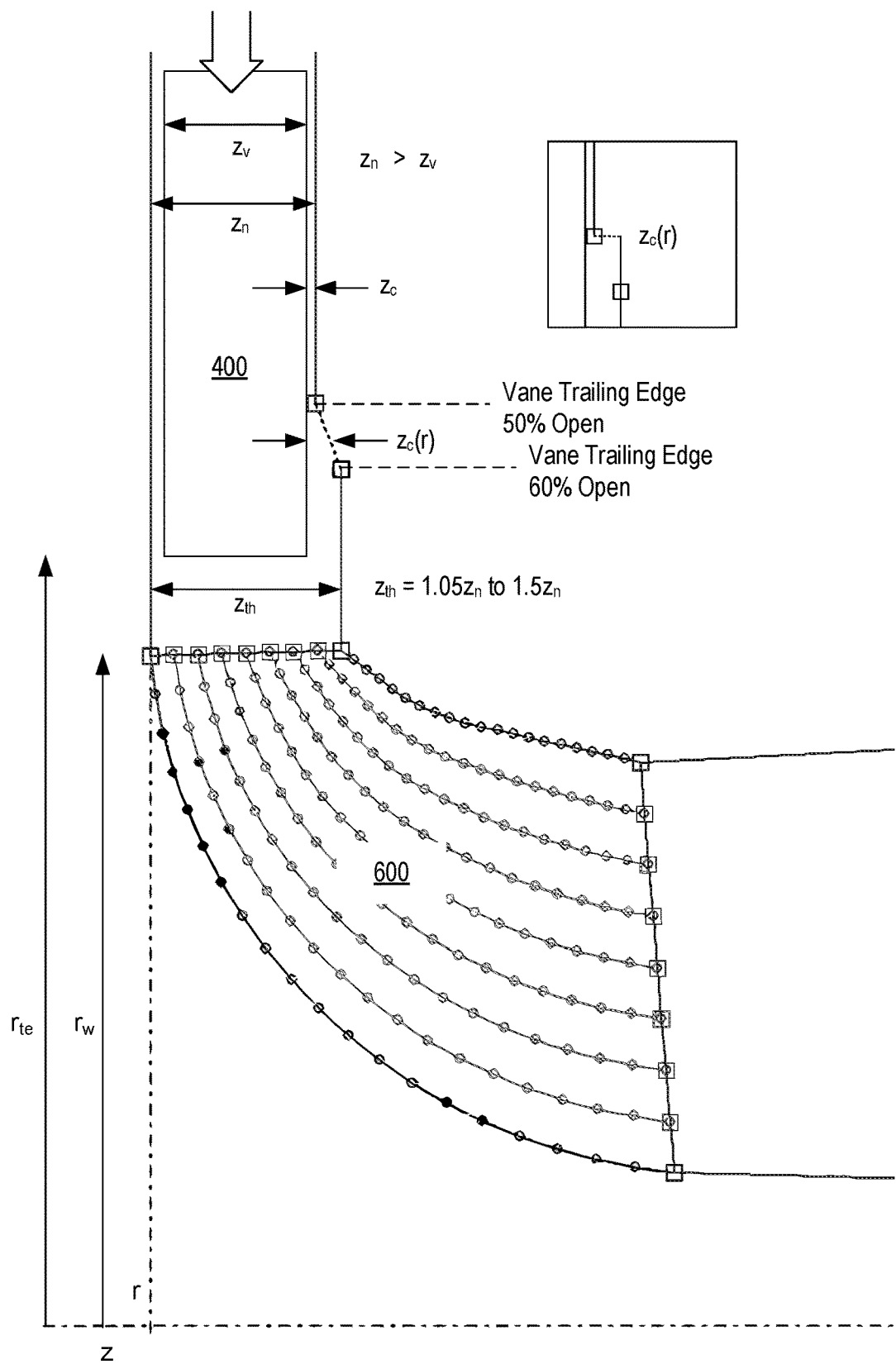
FIG. 8 is a schematic view of an example of a vane with respect to a nozzle and a turbine wheel blade.

FIG. 8 shows a schematic view of the vane 400 and a blade 600 of a turbine wheel. As shown, the increased clearance region can be defined using the vane height $z_v$. For example, consider a nozzle height $z_n$ that can increase to 1.05 to 1.5 times the nozzle height $z_n$ of vane open positions less than 50 percent open.

As explained, the blade 600 can have a leading edge that can be disposed at a radius $r_w$ from a rotational axis z of a wheel having the blade 600 and the trailing edge of the vane 400 can be at a radius $r_{te}$ that depends on an angle of the vane 400. As the vane 400 becomes more open, the trailing edge of the vane 400 becomes closer to the leading edge of the blade 600. As an example, a blade may be a radial flow blade of a radial flow turbine wheel or a mixed flow blade of a mixed flow turbine wheel. In the example of FIG. 8, the blade 600 may be a radial flow blade as the leading edge of the blade 600 is at a constant radius $r_w$ along the height of the leading edge of the blade 600.

In the example of FIG. 8, consider the nozzle height $z_n$ as being approximately 9.07 mm where the increased nozzle height $z_{th}$ (e.g., throat height) is approximately 11 mm. In such an example, the radius of the 50 percent open position may be approximately 46.5 mm from a rotational axis of a turbine wheel and the 60 percent open position may be approximately 42.4 mm from the rotational axis of the turbine wheel. For example, an increase may be approximately 0.5 mm to 2 mm or more. In such an example, exhaust flow may exhibit improved development before experiencing leading edges of blades of a turbine wheel.

As an example, a spacer can define a nozzle height. For example, consider a spacer that defines a nozzle height of 9.07 mm where a clearance between a vane upper surface and a nozzle upper surface is approximately 0.15 mm. In such an example, the clearance may increase to at least 0.5 mm. For example, consider an increased clearance of approximately 2 mm (e.g., 9.07 mm to 11 mm in terms of nozzle heights). As an example, an increased clearance may provide for an increased flow bypass channel that is defined by a percentage of vane height (e.g., 5 percent to 30 percent or optionally more).

As shown in the example of FIG. 8, the increase may be sloped, stepped, etc. For example, a sloped region may be provided with one or more slopes and/or a stepped region may be provided with an approximately 90 degree step. As explained, one or more of a combination of shapes may be utilized to increase clearance.

Figure 9:
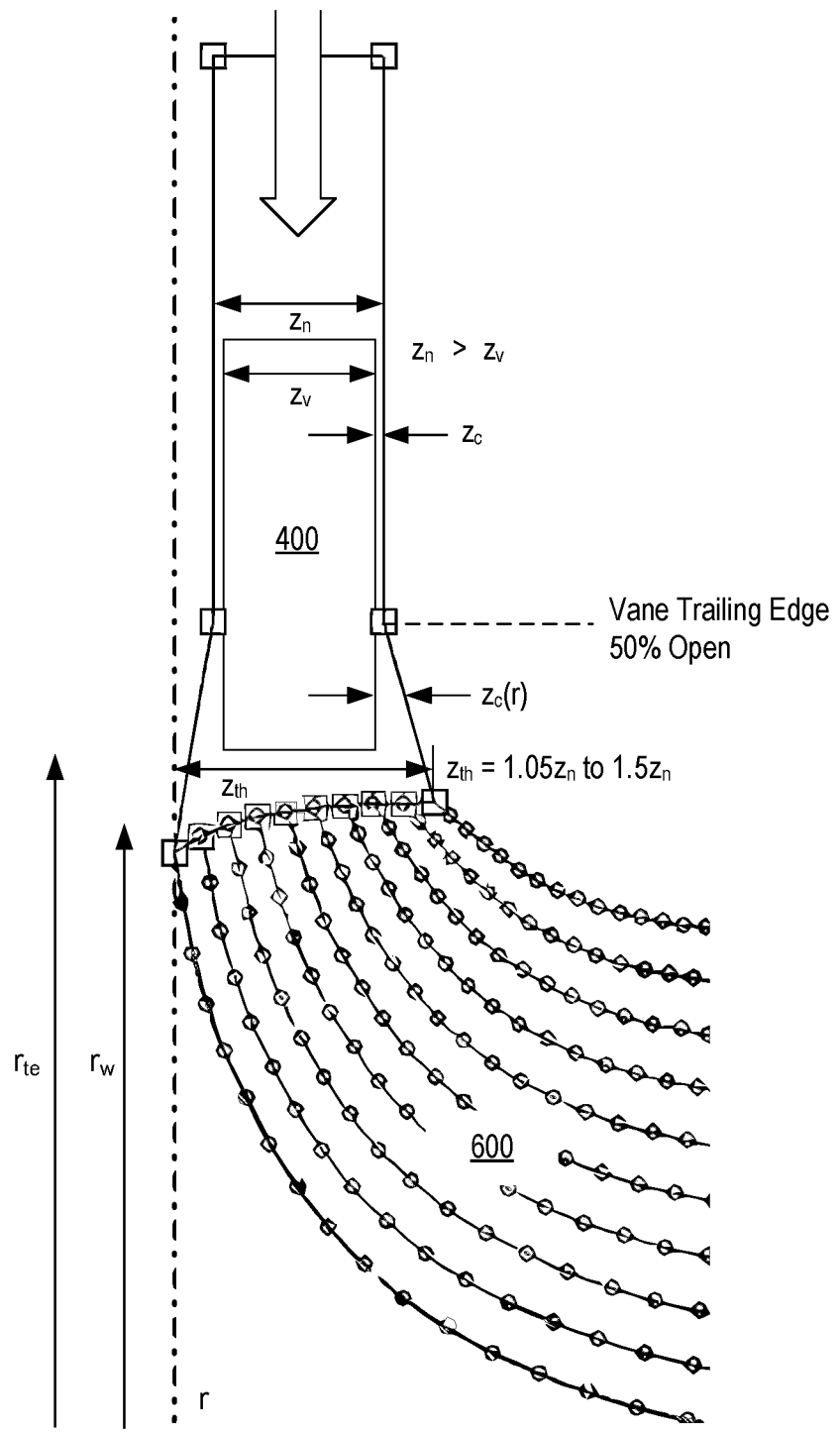
FIG. 9 is a schematic view of an example of a vane with respect to a nozzle and a turbine wheel blade.

FIG. 9 shows a schematic view of the vane 400 and an example of the blade 600 of a turbine wheel. In the example of FIG. 9, the blade 600 may be a mixed flow blade as the leading edge of the blade 600 is not at a constant radius such that the radius $r_w$ can vary along the height of the leading edge of the blade 600 (e.g., to define a cone angle). As an example, an approach as in FIG. 8 and/or an approach as in FIG. 9 may be utilized with a radial flow turbine wheel or a mixed flow turbine wheel.

As shown in the example of FIG. 9, increased clearance regions can be defined using the vane height $z_v$. For example, consider a nozzle height $z_n$ that can increase to 1.05 to 1.5 times the nozzle height z n of vane open positions less than 50 percent open. In the example of FIG. 9, the increase in clearance may be due to shape of a lower nozzle surface (e.g., the surface 252, etc.) and/or an upper nozzle surface (e.g., the surface 302, etc.).

Whether clearance is increased on an upper nozzle surface and/or a lower nozzle surface, one or more of a combination of shapes may be utilized to increase clearance.

Figure 10:
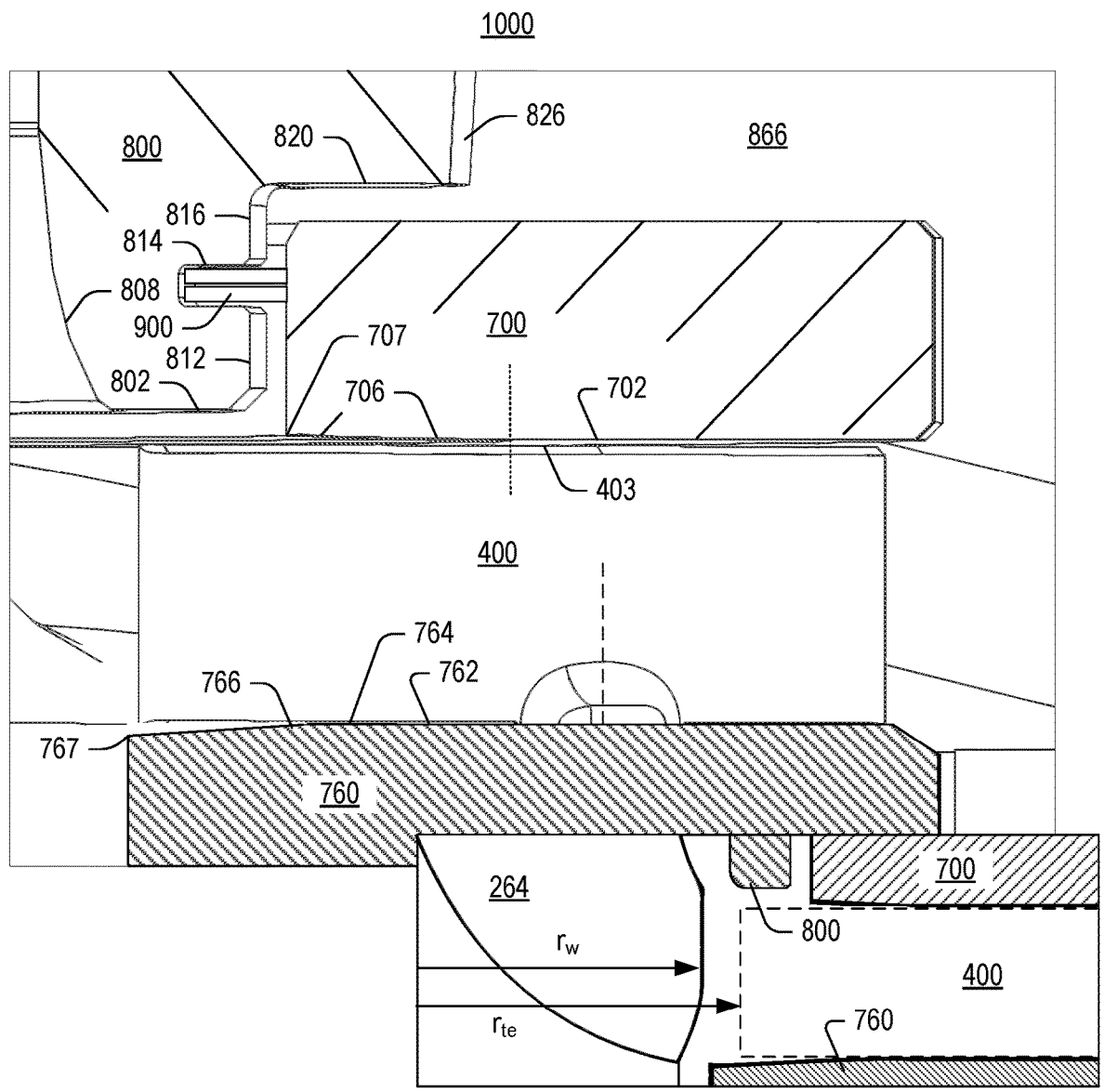
FIG. 10 is a cutaway view of a portion of an example of an assembly.

FIG. 10 shows a cut-away view of a portion of an assembly 1000 that includes the vane 400, component 700 and 760, and a turbine housing 800. As shown, the component 700 and the turbine housing 800 can be assembled using one or more seal members 900 (e.g., piston rings, etc.). As an example, the component 700 may be floating and biased downwardly during operation by a pressure force or it may be biased by a spring force or it may be fit to one or more spacers.

FIG. 10 also shows an inset view where the vane 400 is shown by dashed lines as its position depends on pivot angle. In the example of the inset, the vane can be in a fully open position (e.g., maximum open pivot angle). As shown, the turbine wheel 264 can be defined by a turbine wheel radius $r_w$ and the trailing edge of the vane 400 can be defined by a trailing edge radius $r_{te}$ as in the fully open position. As explained, in a fully open position, the radius $r_{te}$ of the trailing edge of the vane 400 can be approximately 3 percent to approximately 10 percent more than the radius $r_w$ of the turbine wheel (e.g., maximum outer radius). As explained, when the vane 400 is in a closed position (e.g., vane-to-vane contact, etc.), the radius of the trailing edge $r_{te}$ will be greater than in the fully open position. A range of vane angles that is from closed to fully open can be defined via such radii where an open position, such as 50 percent, can be defined as being intermediate the closed position and the fully open position.

In the example of FIG. 10, the component 700 can be a substantially annular component that defines clearances with respect to the upper surface 403 of the vane 400. For example, consider an upper nozzle surface 702 that meets a first transition point 704 that meets a variable surface region 706 that meets a second transition point 707. As shown, the second transition point 707 can be at an innermost end of the component 700 where the one or more seal members 900 can provide for sealing as to exhaust movement from a volute 866 to the nozzle or vice versa.

In the example of FIG. 10, the turbine housing 800 includes a lower surface 802 that transitions to a shroud surface 808. The turbine housing 800 can also include various annular notch features that can accommodate the component 700. For example, consider cylindrical surfaces 812 and 816, which may be separated by an annular recess 814 that can provide for positioning and stabilizing the one or more seal members 900. As shown, the cylindrical surface 816 can extend to an axial face 820, which may then transition to a surface 826 that defines in part the volute 866.

In the example of FIG. 10, a region of constant clearance of approximately 0.12 mm may be increased via a slope (e.g., a conical shape) to a region with a clearance that is at least approximately 0.175 mm. In the example of FIG. 10, a clearance between the upper surface 403 of the vane 400 and the surface 802 of the turbine housing 800 may be approximately 0.8 mm. In such an example, the increased clearance can span in part the component 700 and can span in part the turbine housing 800. In such an example, exhaust flow may utilize the additional space (e.g., increased nozzle space, etc.) for some expansion and/or development prior to encountering a turbine wheel. In such an approach, some amount of efficiency may be gained by the increased space.

In the example of FIG. 10, the component 760 can include a lower nozzle surface 762 that meets a first transition point 764 that meets a variable surface region 766 that meets a second transition point 767. As shown, the second transition point 767 can be at an innermost end of the component 760. As shown, the components 700 and 760 may be shaped differently though providing for an increased clearance for a range of vane open positions. As an example, the assembly 1000 may include features as to an upper nozzle surface and/or features as to a lower nozzle surface to provide for increased clearance for a range or ranges of vane open positions.

As an example, a cartridge and a turbine housing may be shaped such that upon installation of the cartridge in the turbine housing, contact does not occur between vanes and the turbine housing. For example, rims may contact before contact between vanes and the turbine housing can occur. In such an example, risk of the upper surface 403 of the vane 400 contacting the surface 802 of the turbine housing 800 can be reduced. As an example, the component 700 may be of an axial height such that the component 700 contacts the surface 820 before contact between the surface 802 and the upper surface 403 of the vane 400 can occur.

As explained, a cartridge may be axially movable in a turbocharger via one or more spring-like mechanism. Where a shroud surface is positioned on a turbine housing rather than a component such as the component 700, clearance between a turbine wheel and the shroud surface may be more certain during operation.

In the example assembly 1000, the component 700 may be smaller when compared, for example, to the component 300 of FIG. 2, which may provide for lesser thermal effects, stresses, etc. Further, in the assembly 1000, the shroud contour for the turbine wheel is on the turbine housing and not the component 700. Also, by having the component 700 thinner at its inner end compared to its outer end, some thermal effects may be reduced (e.g., consider thermal expansion and contraction due to volume).

Figure 11:
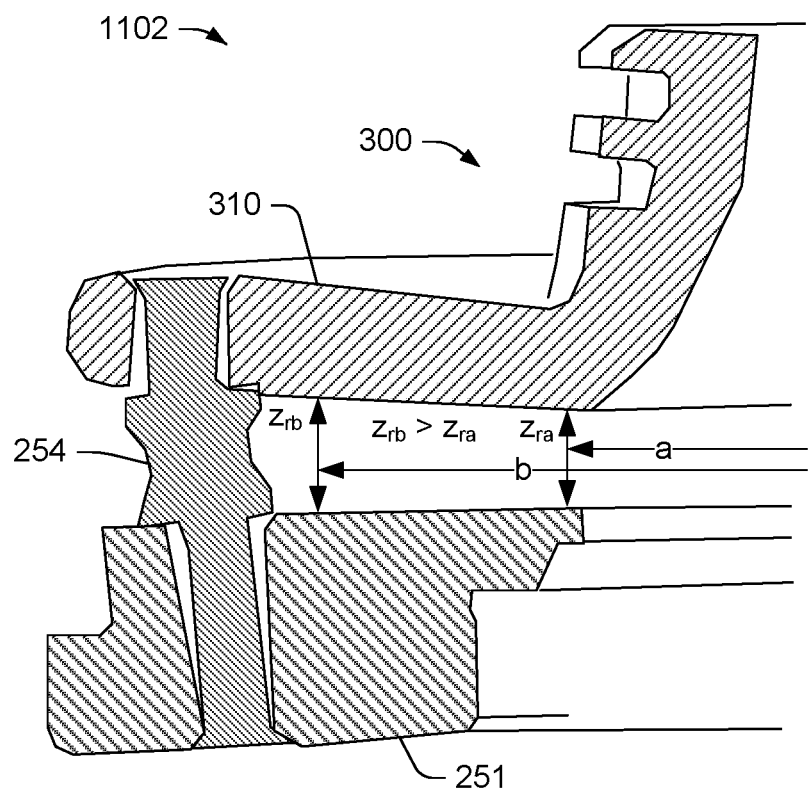
FIG. 11 is a cutaway view of a portion of an example of an assembly and a plot of coefficients of thermal expansion versus temperature for materials.
Figure 11:
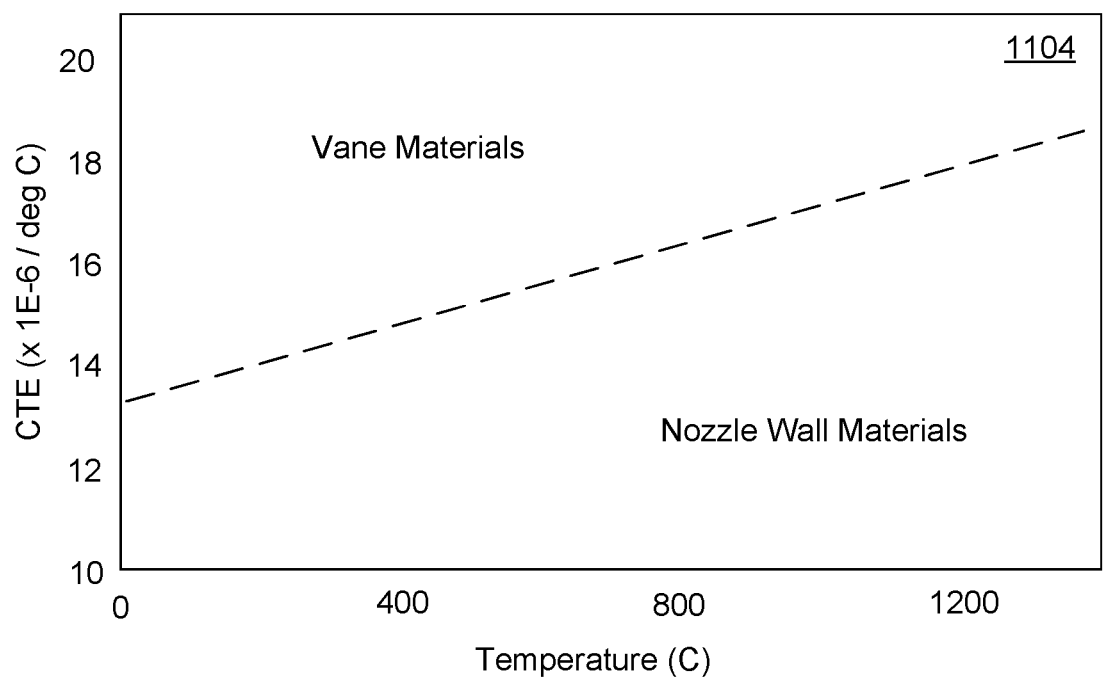

FIG. 11 shows an approximate cutaway view of a portion of an assembly 1102 during a transient in temperature, where the assembly 1102 includes the plate component 251, the spacer 254 and the annular plate portion 310 of the nozzle wall component 300, along with a plot 1104 of coefficients of thermal expansion (CTE) with respect to temperature.

In the plot 1104, a vane materials region and a nozzle wall materials region are approximately shown. For example, a vane can be made of a material that has a higher CTE than a material of a nozzle wall (e.g., upper and/or lower). As a vane is generally made from a higher CTE material and smaller (less volume) than a nozzle wall, the vane will react more rapidly to a change in temperature than a nozzle wall (e.g., the plate component 251, the annular plate portion 310, etc.). As a vane has less mass, it has less thermal capacity so it will heat and cool faster than a nozzle wall(s) even if materials utilized have the same CTE. As such, clearance(s) can be altered, including being reduced. For example, consider a cold clearance (e.g., ambient temperature) of approximately 0.16 mm and a hot clearance of approximately 0.06 mm. During transient operation, where vanes can be moving, reduced clearance can lead to control issues (e.g., sticking, binding, etc.); whereas, in a thermal steady state, clearances can be as suitably designed as components can be at steady state temperature distribution. As an example, one or more increased clearances, as explained, can be provided such that dynamic operation under dynamic thermal conditions does not lead to control issues (e.g., sticking, binding, etc.). During dynamic thermal conditions, a temperature transient can be non-uniform as defined about a rotational axis such that individual vanes in a set of vanes can be experiencing different temperatures. Given such spatially non-uniform transient conditions, one or more of the individual vanes may be more likely to stick (e.g., bind) than one or more others, which may also cause uneven (e.g., non-uniform) wear in a turbine assembly. By providing one or more increased clearances, as explained, risk of one or more of the individual vanes sticking (e.g., binding) can be reduced; noting that control issues can arise from sticking (e.g., binding) of a single vane in a set of vanes.

As shown in the portion of the assembly 1102, the nozzle space, as defined by the components 251 and 300, can become V-shaped due to the thermal gradient between the outer and the inner radius of the components 251 and 300 along with the spacer 254 causing some limitations and due to spring-like support from the heat shield 290 pressing at and/or near an inner radius of the component 251. In the example of FIG. 11, axial heights $z_{rb}$ at a radius "b" and $z_{ra}$ at a radius "a" are shown where, during a temperature transient, $z_{rb}$ is greater than $z_{ra}$ hence forming a V-shape in cross-section. Given the tendency to form a V-shape at elevated temperatures, etc., utilization of one or more components that can increase clearance between a nozzle wall and a vane can reduce risk of vane sticking (e.g., binding, etc.). For example, by increasing clearance(s) between a vane and one or more nozzle surfaces near and/or at an inner perimeter of a component or components (e.g., to be more than at or near an outer perimeter) can help to recover consumed CTE-related clearance in transient heating and cooling along with consumed clearance that may be a result of one or more other phenomena (e.g., soot deposition, etc.). Thus, by providing clearance(s), performance may be improved (e.g., controllability, lifespan, etc.).

As to some examples of materials of construction for vanes, consider NI-RESIST (high nickel alloy cast irons), NITRONIC 60 (alloy 218, e.g., Cr 17, Mn 8, Ni 8.5, Si 4, N 0.13, C 0.10, Fe balance), 310 stainless steel (SS), etc. As to some examples of materials of construction for components that define a nozzle space, consider INCONEL 718, SiMoCr, etc. As explained, a component that defines a nozzle space (e.g., a component that forms a nozzle wall) can be formed with one or more features (e.g., step, slope, etc.) to provide for an increased clearance with respect to a set of vanes when the set of vanes are in an open position (e.g., 50% open or more, etc.).

Figure 12:
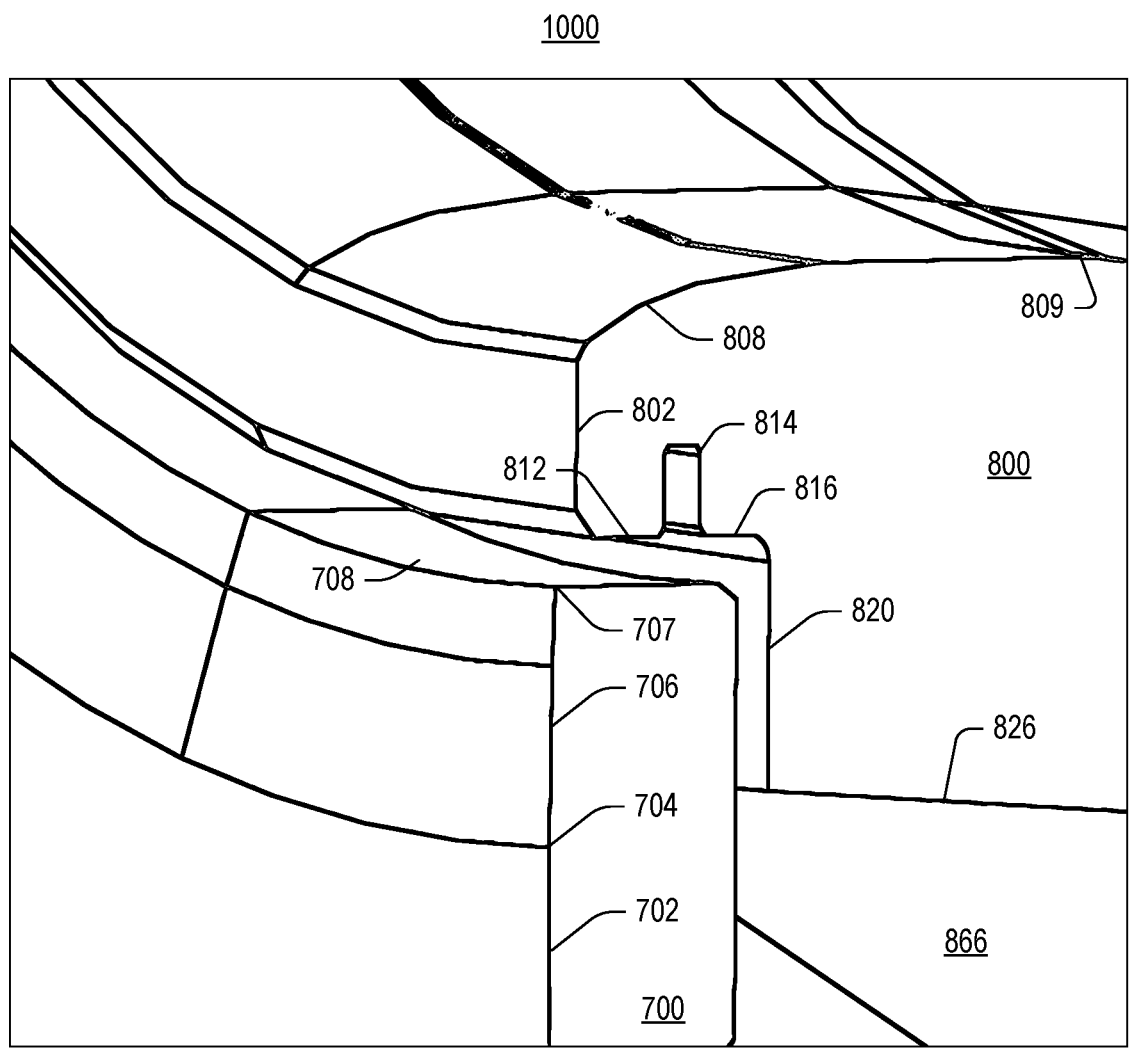
FIG. 12 is a cutaway view of a portion of an example of the assembly of FIG. 10.

FIG. 12 shows another cut-away view of the example assembly 1000 of FIG. 10, without the vane 400 and without the one or more seal members 900. As shown in FIG. 12, the component 700 can include the upper nozzle surface 702 as a substantially level portion that defines a constant nozzle height where the surface 702 meets a first transition point 704 that meets a variable surface region 706 that increases nozzle height with respect to decreasing radius that meets a second transition point 707 that meets a cylindrical surface 708 that can define an inner perimeter of the component 700. As shown, the turbine housing 800 can include the surface 802 as being positioned at a greater axial height than the second transition point 707. The turbine housing 800 can also include a surface 809 that meets the shroud surface 808 where the surface may define a minimum diameter of the turbine housing 800.

As an example, the component 700 may be formed via one or more processes to provide for a change in nozzle height. For example, consider machining where such machining can grind a beveled region into a stock non-beveled surface (see, e.g., the surface 702). As an example, one or more bevels may be imparted such that one or more angles, transitions, etc., are formed.

Figure 13:
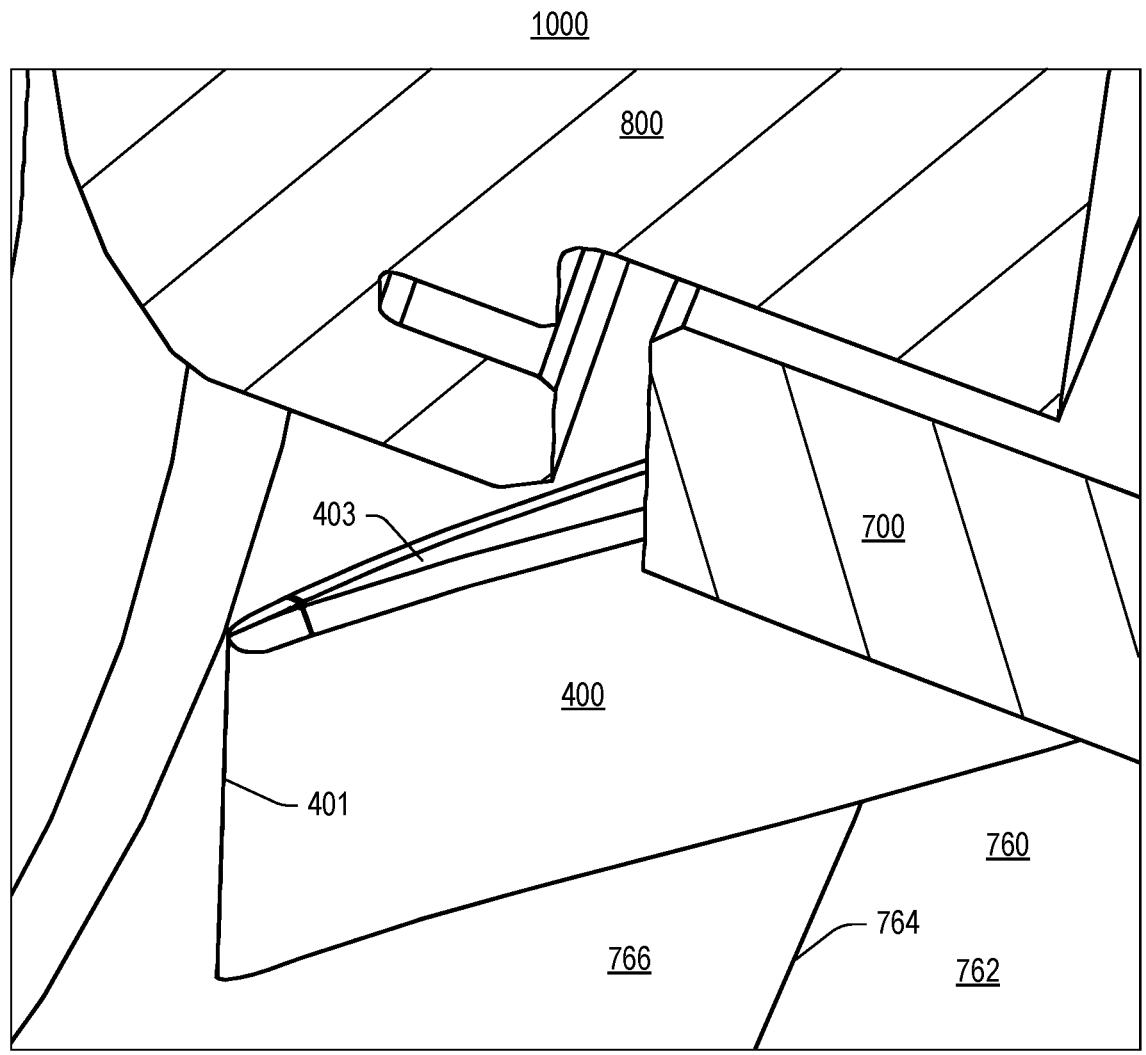
FIG. 13 is a cutaway view of a portion of an example of the assembly of FIG. 10.

FIG. 13 shows another cut-away view of the example assembly 1000 of FIG. 10. In the example of FIG. 13, the vane 400 can be seen, particularly in relationship to the components 700 and 760 and the housing 800 where a substantial portion of the vane 400 has an increased clearance in the open position of the vane 400 as shown. As explained, such an approach can reduce risk of binding and/or reduce resistance to exhaust flow when a vane is in an open position that is at or beyond 50 percent open.

Figure 14:
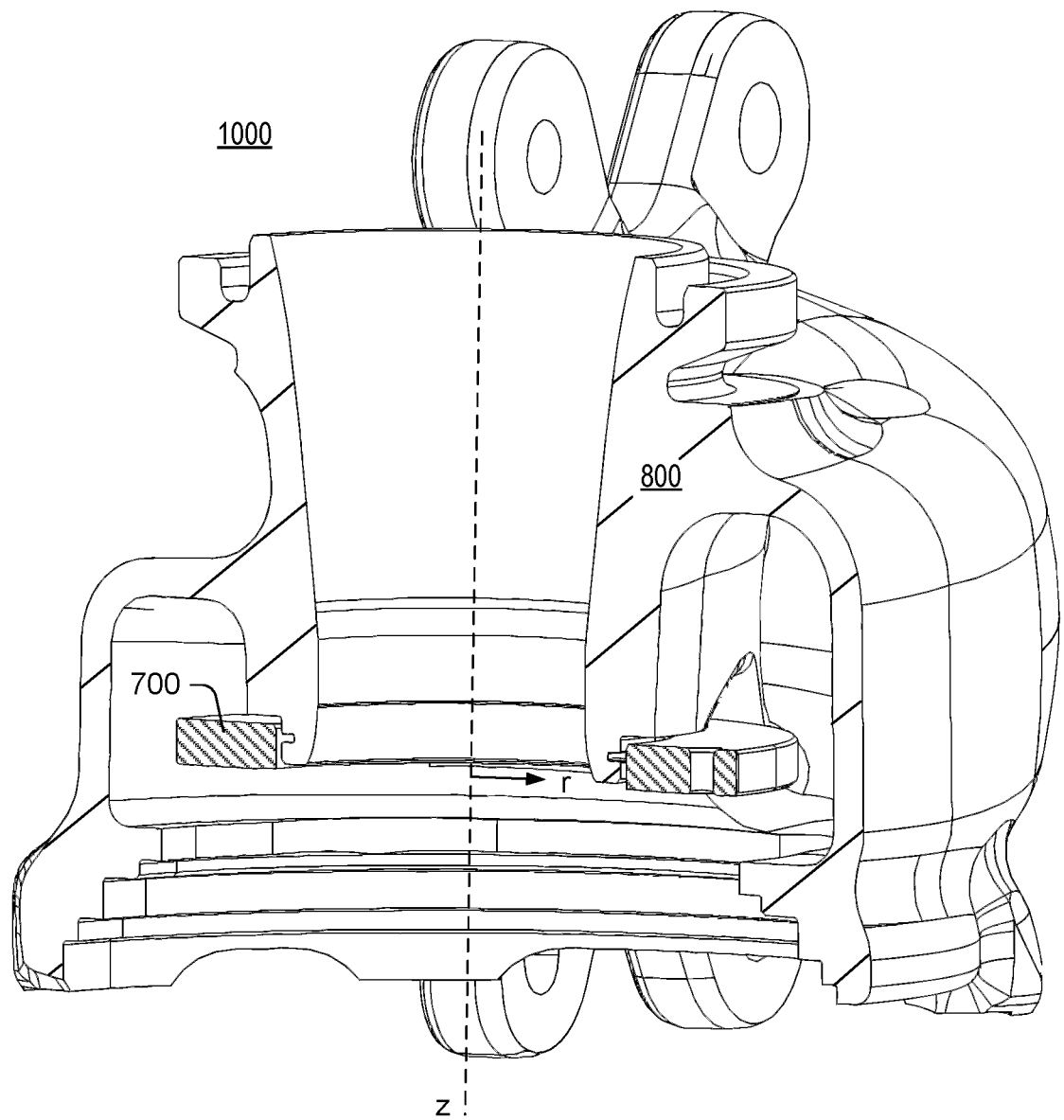
FIG. 14 is a cutaway view of an example of the assembly of FIG. 10.

FIG. 14 shows a cut-away view of the example assembly 1000 with the turbine housing 800 and the component 700. As an example, one or more features of the cartridge 250 of FIGS. 2, 3A and 3B may be included in such an assembly.

As an example, a turbine assembly with an increased vane to nozzle clearance for vane open positions greater than or equal to 50 percent can provide for an expansion flow pass to reduce shock strength at high pressure ratio (PR), can provide for performance map width extension to increase flow capacity without a change to vane height, can maintain the same performance at a vanes position less than 50 percent closed, can lower vane aerodynamic torque (e.g., provide for smaller vane height than end wall height), can reduce risk of vane/nozzle wall friction due to thermal expansion, thermal distortion or combustion residual deposits.

Figure 15:
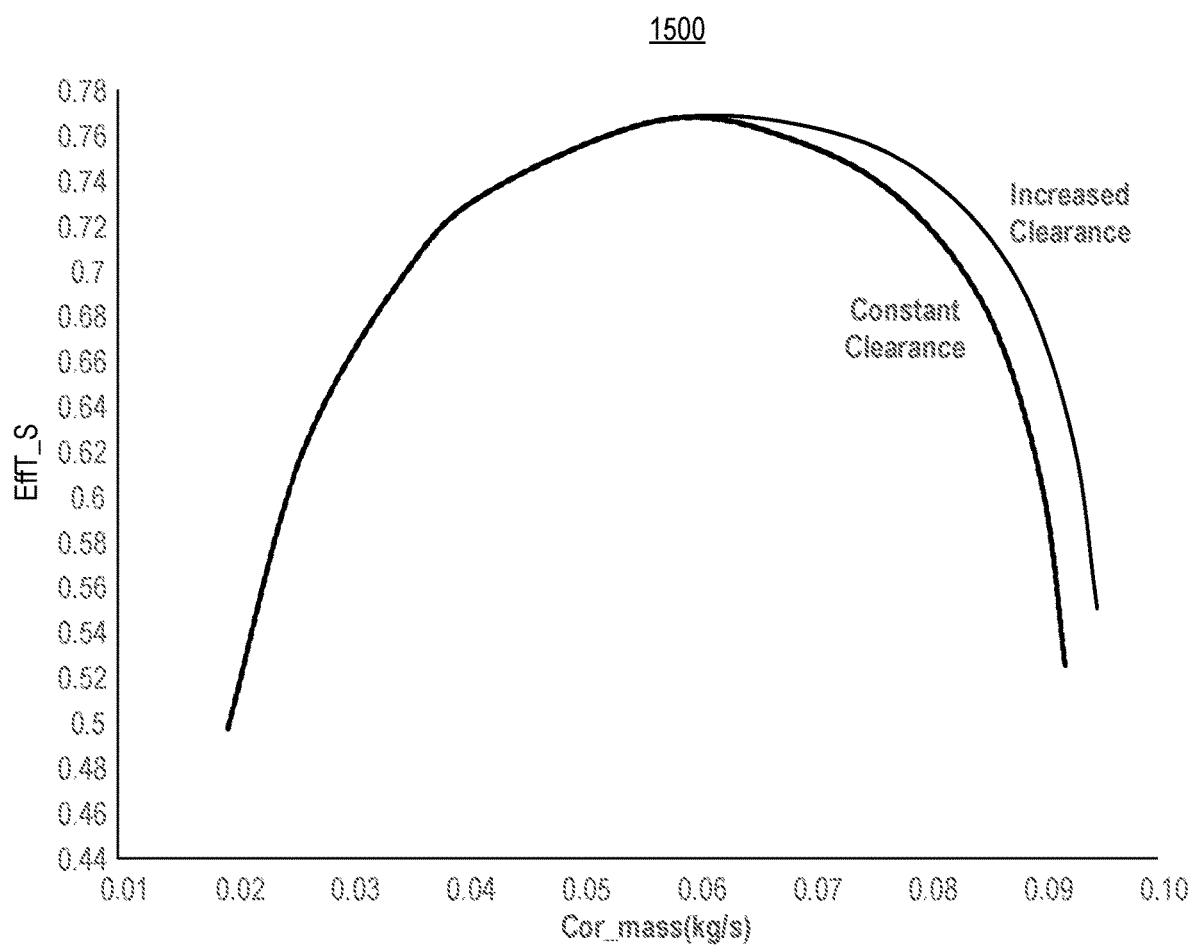
FIG. 15 is an example plot of trial data.

FIG. 15 shows an example plot 1500 of trial results for two different assemblies for a given pressure ratio (PR) where one of the assemblies includes an increased clearance for vane open positions of at least 50 percent (e.g., increased clearance) and where the other one of the assemblies includes a constant clearance. As shown, the assembly with increased clearance can provide for increased efficiency at higher corrected mass flow (kg/s) compared to the constant clearance assembly. Further, at lower corrected mass flow (e.g., less than approximately 0.06 kg/s), the two assemblies exhibit the same or similar performance. In such an example, the difference may be defined with respect to a maximum efficiency (e.g., a corrected mass flow that corresponds to a peak efficiency for a particular vanes position).

Figure 16:
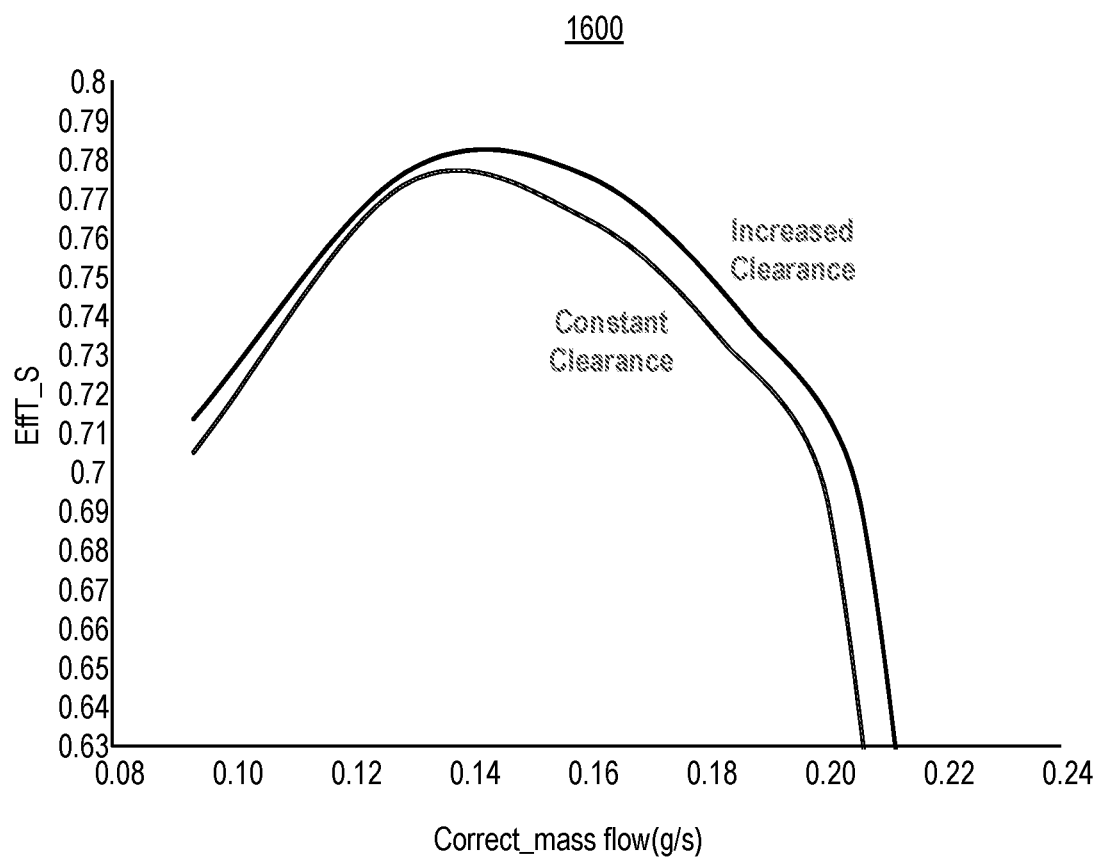
FIG. 16 is an example plot of trial data.

FIG. 16 shows an example plot 1600 of trial results for two different assemblies for a given pressure ratio (PR) where one of the assemblies includes an increased clearance for vane open positions of at least 50 percent (e.g., increased clearance) and where the other one of the assemblies includes a constant clearance. As shown, the assembly with increased clearance can provide for increased efficiency at higher corrected mass flow (kg/s) compared to the constant clearance assembly. Further, at lower corrected mass flow (e.g., less than approximately 0.135 g/s), the two assemblies exhibit the same or similar performance. In such an example, the difference may be defined with respect to a maximum efficiency (e.g., a corrected mass flow that corresponds to a peak efficiency for a particular vanes position).

In the example of FIG. 16, the increased clearance example exhibits improved efficiency after a vanes open position of 50 percent. In such an example, high end performance is improved without performance difference at the low end. In such an example, high cycle fatigue (HCF) loading can be reduced (e.g., early expansion of flow before the wheel leading edge). As an example, in a fully opened position of vanes, an annular clearance can exist between vane trailing edges and a turbine wheel where such an annular clearance may be defined by a radius of the turbine wheel. For example, such a clearance can be between approximately 3 percent and 10 percent of the radius of a turbine wheel.

Given the data in the plots 1500 and 1600, a turbocharger turbine assembly may be made with vanes of a lesser vane height while being able to achieve suitable performance at high mass flow rates. By using vanes with a smaller vane height, vane loading may be reduced, which can provide for a reduction in actuation force and hence allow for a smaller actuator (e.g., an actuator with lesser maximum force). As explained, a reduced risk of sticking (e.g., binding) may also provide for a reduction in actuation force and hence allow for a smaller actuator (e.g., an actuator with lesser maximum force).

As an example, a method can include determining a vanes position for a maximum efficiency with respect to corrected mass flow. In such an example, the vanes position can be translated into a radius or diameter as to trailing edges of the vanes. In such an example, a component or components of a cartridge may be machined to provide for increased clearance (e.g., exhaust passage) for vanes position equal to or greater than the vanes position that corresponds to the maximum efficiency.

As explained, vane top and/or bottom clearance in a nozzle can have a detrimental impact on VNT stage performance. Generally, such clearances are maintained as small as possible along an entire vane opening range which increases the risk of vane binding (e.g., sticking) and/or vane to nozzle/pipe friction. Thus, to increase the flow range of a VNT stage, a larger vane height is needed, which, in turn, increases vane loading. With an increased load, a larger actuator is needed to pivot the vanes.

As explained, an assembly can include an increased clearance region for passage of exhaust above and/or below each vane in a nozzle, which can improve high end performance, lower HCF excitation and reduce risk of vane to nozzle wall(s) friction or sticking. By providing an increased clearance as a bypass passage at/near the inner perimeter of a nozzle ring, the performance flow range can be increased while using a smaller vane height for a lower actuation force.

As an example, a method can include machining a stock annular component (e.g., as a hat or flat component) and/or selecting vanes with a smaller height.

As an example, a turbine housing assembly can include a turbine housing that defines a rotational axis for a turbine wheel; and a cartridge receivable by the turbine housing, where the cartridge includes a nozzle wall component with an upper nozzle surface and a plate component with a lower nozzle surface, where the upper nozzle surface and the lower nozzle surface define a nozzle space, and vanes positioned in the nozzle space, where the vanes are pivotable between a closed vanes position of 0 percent open and a fully open vanes position of 100 percent open, and where, for a vanes position of at least 50 percent open and less than 75 percent open, an axial dimension of the nozzle space increases with respect to decreasing radius as measured from the rotational axis. In such an example, for a vanes position less than 50 percent open, the axial dimension of the nozzle space can be constant.

As an example, an axial dimension of a nozzle space can increase with respect to decreasing radius at a transition radius, where the transition radius is defined by trailing edges of the vanes for a vanes position of at least 50 percent open and less than 75 percent open. In such an example, the vanes position can correspond to a maximum efficiency with respect to corrected mass flow.

As an example, for a fully open vanes position, an annular clearance can exist with respect to a turbine wheel and trailing edges of vanes, where the annular clearance can be at least 3 percent of a radius of the turbine wheel and less than 10 percent of the radius of the turbine wheel.

As an example, for a closed vanes position, contact can exist between adjacent vanes. In such an example, the contact can act to limit rotation (e.g., pivoting) of the vanes. As an example, a cartridge, a control linkage, etc., may include one or more features that act as a physical stop that may define a closed vanes position. In such an example, the vanes may be nearly in contact where throats defined between adjacent vanes are small such that the vanes act as barriers to exhaust flow from a volute to a turbine wheel space. In such an example, nearly in contact may be defined via a vane-to-vane clearance (e.g., throat width) of less than approximately 3 mm. A closed vanes position can define a minimum exhaust flow condition for a turbine housing assembly while a fully open position may define a maximum exhaust flow condition for a turbine housing assembly.

As an example, in a turbine housing assembly, an axial dimension of a nozzle space can increase to a constant axial dimension. As an example, an axial dimension of a nozzle space can increase according to a slope and/or a step.

As an example, in a turbine housing assembly, each of a plurality of vanes (e.g., a set of vanes) can have a constant axial vane height between a respective trailing edge and a respective leading edge. For example, consider a slight chamfer at a leading edge and a slight chamfer at a trailing edge where the axial vane height is constant over approximately 90 percent or more of a length of the vane.

As an example, a turbine housing assembly can include a component that defines a nozzle space where a surface of the component provides an upper nozzle surface that is sloped and/or can include a component that defines a nozzle space where a surface of the component provides a lower nozzle surface that is sloped.

As an example, a turbine housing assembly can include a component that defines a nozzle space where a surface of the component provides an upper nozzle surface that is stepped and/or can include a component that defines a nozzle space where a surface of the component provides a lower nozzle surface that is stepped.

As an example, a turbine housing assembly can include a component that defines a nozzle space where a surface of the component provides an upper nozzle surface that is sloped and/or stepped and/or can include a component that defines a nozzle space where a surface of the component provides a lower nozzle surface that is sloped and/or stepped.

As an example, a turbine housing assembly can include a turbine housing that includes a shroud surface. In such an example, the shroud surface can define in part a turbine wheel space for a turbine wheel.

As an example, a turbine housing assembly can include a nozzle wall component that includes a shroud surface. In such an example, the shroud surface can define in part a turbine wheel space for a turbine wheel.

As an example, a method can include operating a turbine housing assembly that includes a turbine housing that defines a rotational axis for a turbine wheel; and a cartridge receivable by the turbine housing, where the cartridge includes a nozzle wall component with an upper nozzle surface and a plate component with a lower nozzle surface, where the upper nozzle surface and the lower nozzle surface define a nozzle space, and vanes positioned in the nozzle space, where the vanes are pivotable between a closed vanes position of 0 percent open and a fully open vanes position of 100 percent open, and where, for a vanes position of at least 50 percent open and less than 75 percent open, an axial dimension of the nozzle space increases with respect to decreasing radius as measured from the rotational axis; flowing exhaust in clearances between the vanes and the upper nozzle surface; and, responsive to pivoting the vanes from a vanes position less than 50 percent open to a vanes position greater than 75 percent open, flowing exhaust in increased clearances between the vanes and the upper nozzle surface. In such an example, the increased clearances can reduce risk of binding of the vanes in the nozzle space and/or the increased clearances can promote development of exhaust flow prior to a turbine wheel space (e.g., in a region adjacent to a turbine wheel space where the region includes the increased clearances).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine housing assembly comprising:
   a turbine housing that defines a rotational axis for a turbine wheel;
   a turbine wheel that comprises blades, wherein each blade comprises a leading edge, wherein a leading edge height of the leading edge is defined between a lower point of the leading edge and an upper point of the leading edge; and
   a cartridge receivable by the turbine housing, wherein the cartridge comprises a nozzle wall component with an upper nozzle surface and a plate component with a lower nozzle surface, wherein the upper nozzle surface and the lower nozzle surface define a nozzle space, and vanes positioned in the nozzle space, wherein the vanes are pivotable between a closed vanes position of 0 percent open and a fully open vanes position of 100 percent open, and
   wherein, for a vanes position of at least 50 percent open and less than 75 percent open, an axial dimension of the nozzle space increases with respect to decreasing radius as measured from the rotational axis to increase efficiency with respect to corrected mass flow compared to a constant axial dimension of the nozzle space, wherein the upper point of the leading edge of each of the blades of the turbine wheel is equal to or above an uppermost point of the upper nozzle surface, and wherein, for a vanes position less than 50 percent open the axial dimension of the nozzle space is constant.

2. The turbine housing assembly of claim 1, wherein the axial dimension of the nozzle space increases with respect to decreasing radius at a transition radius, wherein the transition radius is defined by trailing edges of the vanes for the vanes position of at least 50 percent open and less than 75 percent open.

3. The turbine housing assembly of claim 2, wherein the vanes position corresponds to a maximum efficiency with respect to corrected mass flow.

4. The turbine housing assembly of claim 1, wherein, for the fully open vanes position, an annular clearance exists with respect to the turbine wheel and trailing edges of the vanes, wherein the annular clearance is at least 3 percent of a radius of the turbine wheel and less than 10 percent of the radius of the turbine wheel.

5. The turbine housing assembly of claim 1, wherein, for the closed vanes position, contact exists between adjacent vanes.

6. The turbine housing assembly of claim 1, wherein the axial dimension of the nozzle space increases to a constant axial dimension.

7. The turbine housing assembly of claim 1, wherein the axial dimension of the nozzle space increases according to a slope.

8. The turbine housing assembly of claim 1, wherein each of the vanes comprises a constant axial vane height between a respective trailing edge and a respective leading edge.

9. The turbine housing assembly of claim 1, wherein the upper nozzle surface is sloped.

10. The turbine housing assembly of claim 1, wherein the lower nozzle surface is sloped.

11. The turbine housing assembly of claim 1, wherein the upper nozzle surface is sloped and wherein the lower nozzle surface is sloped.

12. The turbine housing assembly of claim 1, wherein the turbine housing comprises a shroud surface.

13. The turbine housing assembly of claim 1, wherein the nozzle wall component comprises a shroud surface.

14. A method comprising:

operating a turbine housing assembly that comprises a turbine housing that defines a rotational turbine wheel axis; a turbine wheel that comprises blades, wherein each blade comprises a leading edge, wherein a leading edge height of the leading edge is defined between a lower point of the leading edge and an upper point of the leading edge; and a cartridge receivable by the turbine housing, wherein the cartridge comprises a nozzle wall component with an upper nozzle surface and a plate component with a lower nozzle surface, wherein the upper nozzle surface and the lower nozzle surface define a nozzle space, and vanes positioned in the nozzle space, wherein the vanes are pivotable between a closed vanes position of 0 percent open and a fully open vanes position of 100 percent open, and wherein, for a vanes position of at least 50 percent open and less than 75 percent open, an axial dimension of the nozzle space increases with respect to decreasing radius as measured from the rotational axis;

flowing exhaust in clearances between the vanes and the upper nozzle surface; and responsive to pivoting the vanes from a vanes position less than 50 percent open to a vanes position greater than 75 percent open, flowing exhaust in increased clearances between the vanes and the upper nozzle surface to increase efficiency with respect to corrected mass flow compared to a constant axial dimension of the nozzle space, wherein the upper point of the leading edge of each of the blades of the turbine wheel is equal to or above an uppermost point of the upper nozzle surface, and wherein, for a vanes position less than 50 percent open the axial dimension of the nozzle space is constant.

15. The method of claim 14, wherein the increased clearances reduce risk of binding of the vanes in the nozzle space.

16. The method of claim 14, wherein the increased clearances promote development of exhaust flow prior to a turbine wheel space.

* * * * *